United States Patent
Momcilovic et al.

(10) Patent No.: US 11,508,081 B2
(45) Date of Patent: Nov. 22, 2022

(54) SEALED ACTIVE MARKER FOR PERFORMANCE CAPTURE

(71) Applicant: Weta Digital Limited, Wllington (NZ)

(72) Inventors: Dejan Momcilovic, Wellington (NZ); Jake Botting, Wellington (NZ)

(73) Assignee: UNITY TECHNOLOGIES SF, San Francisco, CA (US)

(*) Notice: Subject to any disclaimer, the term of this patent is extended or adjusted under 35 U.S.C. 154(b) by 0 days.

(21) Appl. No.: 17/107,920

(22) Filed: Nov. 30, 2020

(65) Prior Publication Data

US 2021/0270924 A1   Sep. 2, 2021

Related U.S. Application Data

(60) Provisional application No. 63/055,112, filed on Jul. 22, 2020, provisional application No. 63/055,114, filed on Jul. 22, 2020, provisional application No. 62/983,523, filed on Feb. 28, 2020.

(51) Int. Cl.

| | |
|---|---|
| *G06T 7/557* | (2017.01) |
| *G06T 7/90* | (2017.01) |
| *G06F 1/16* | (2006.01) |
| *G01S 1/70* | (2006.01) |
| *G06T 13/40* | (2011.01) |

(Continued)

(52) U.S. Cl.
CPC ............ *G06T 7/557* (2017.01); *G01S 1/7034* (2019.08); *G06F 1/163* (2013.01); *G06T 7/90* (2017.01); *G06T 13/40* (2013.01); *H04N 9/04* (2013.01); *H04N 5/33* (2013.01)

(58) Field of Classification Search
CPC .......... G01S 1/7034; G06T 13/40; H04N 9/04
USPC ......................................................... 348/77
See application file for complete search history.

(56) References Cited

U.S. PATENT DOCUMENTS

| | | |
|---|---|---|
| 6,324,296 B1 | 11/2001 | McSheery |
| 6,801,637 B2 | 10/2004 | Voronnka |
| 7,629,994 B2 | 12/2009 | Dobrin |

(Continued)

FOREIGN PATENT DOCUMENTS

CN    209784950    * 12/2019

OTHER PUBLICATIONS

Chatzitofis et al., "DeepMoCap; deep optical motion capture using multiple depth sensors and retro-reflectors", 2019, 2019: Year.

(Continued)

*Primary Examiner* — On S Mung
(74) *Attorney, Agent, or Firm* — Trellis IP Law Group, PC; Lisa Benado

(57) ABSTRACT

A sealed active marker apparatus of a performance capture system is described to provide protective housing for active marker light components coupled to a strand and attached via a receptacle, to an object, such as via a wearable article, in a live action scene. The receptacle includes a protrusion portion that permits at least one particular wavelength range of light emitted from the enclosed active marker light component, to diffuse in a manner that enables easy detection by a sensor device. A base portion interlocks with a bottom plate of the receptacle to secure the strand within one or more channels. A sealant material coating portions of the apparatus promotes an insulating environment for the active marker light component.

20 Claims, 13 Drawing Sheets

(51) Int. Cl.
*H04N 9/04* (2006.01)
*H04N 5/33* (2006.01)

(56) References Cited

U.S. PATENT DOCUMENTS

| | | |
|---|---|---|
| 10,373,517 B2 | 8/2019 | Becker |
| 10,573,050 B1 | 2/2020 | Liu |
| 10,593,101 B1 | 3/2020 | Han |
| 10,657,704 B1 | 5/2020 | han |
| 10,701,253 B2 | 6/2020 | Knoll |
| 10,812,693 B2 | 10/2020 | Estebecorena |
| 2004/0161246 A1 | 8/2004 | Matsutshita |
| 2005/0105772 A1 | 5/2005 | Voronka |
| 2008/0246694 A1 | 10/2008 | Fischer |
| 2009/0270193 A1 | 10/2009 | Stremmel |
| 2011/0025853 A1 | 2/2011 | Richardson |
| 2012/0307021 A1 | 12/2012 | Tsai |
| 2014/0320667 A1 | 10/2014 | Densham |
| 2015/0252955 A1* | 9/2015 | Boschetto ............ F21V 23/002 362/249.02 |
| 2015/0336012 A1 | 11/2015 | Stenzler |
| 2015/0336013 A1 | 11/2015 | Stenzler |
| 2015/0356737 A1 | 12/2015 | Ellsworth |
| 2017/0177939 A1 | 6/2017 | Beall |
| 2017/0305331 A1 | 10/2017 | Soehner |
| 2017/0366805 A1 | 12/2017 | Sevostianov |
| 2018/0131880 A1 | 5/2018 | Hicks |
| 2018/0306898 A1 | 10/2018 | Pusch |
| 2019/0257912 A1 | 8/2019 | Remelius |

OTHER PUBLICATIONS

Nageli et al., "Flycn: real-time environment-independent multi-view human pose estimation with aeriel vehicles", 2018 [Year: 2018].

\* cited by examiner

800

```
┌─────────────────────────────────────┐
│ Injection mold receptacle top       │
│ component and bottom plate          │
│                              802    │
└─────────────────────────────────────┘
                 │
                 ▼
┌─────────────────────────────────────┐
│ Position active marker coupled to a │◄──┐
│ strand onto platform of the bottom  │   │
│ plate                        804    │   │
└─────────────────────────────────────┘   │
                 │                        │
                 ▼                        │
┌─────────────────────────────────────┐   │
│ Engage strand into channels of the  │   │
│ bottom plate                        │   │
│                              806    │   │
└─────────────────────────────────────┘   │
                 │                        │
                 ▼                        │
┌─────────────────────────────────────┐   │
│ Insert pegs of bottom plate into    │   │
│ corresponding holes of base portion │   │
│                              808    │   │
└─────────────────────────────────────┘   │
                 │                        │
                 ▼                        │
┌─────────────────────────────────────┐   │
│ Fuse the base portion and the       │   │
│ bottom plate together               │   │
│                              810    │   │
└─────────────────────────────────────┘   │
                 │                        │
                 ▼                        │
           ╱  More active ╲               │
          ╱  markers for   ╲   YES        │
          ╲  on the strand? ╱─────────────┘
           ╲     812      ╱
                 │ NO
                 ▼
┌─────────────────────────────────────┐
│ Coat with Sealant                   │
│                              814    │
└─────────────────────────────────────┘
                 │
                 ▼
┌─────────────────────────────────────┐
│ Apply adhesive elements             │
│                              816    │
└─────────────────────────────────────┘
                 │
                 ▼
┌─────────────────────────────────────┐
│ Attach to wearable article and      │
│ control unit                        │
│                              818    │
└─────────────────────────────────────┘
```

FIG. 8

SEALED ACTIVE MARKER FOR PERFORMANCE CAPTURE

CROSS REFERENCES TO RELATED APPLICATIONS

This application claims the benefit of U.S. Provisional Patent Application Ser. No. 62/983,523, entitled ACTIVE MARKER DEVICE FOR PERFORMANCE CAPTURE, filed on Feb. 28, 2020 (WD0032PP1); U.S. Provisional patent application Ser. No. 63/055,112, entitled ACTIVE MARKER ENHANCEMENTS FOR PERFORMANCE CAPTURE, filed on Jul. 22, 2020 (WD0032PP2); and U.S. Provisional Patent Application Ser. No. 62/055,114, entitled SEALED ACTIVE MARKER ENHANCEMENTS FOR PERFORMANCE CAPTURE, filed on Jul. 22, 2020 (WD0032 PP3), which are all hereby incorporated by reference as if set forth in full in this application for all purposes.

This application is related to the following applications, U.S. patent application Ser. No. 17/107,915, entitled ACTIVE MARKER APPARATUS FOR PERFORMANCE CAPTURE, filed on Nov. 30, 2020 (WD0032US2) and U.S. patent application Ser. No. 17/107,926, entitled ACTIVE MARKER ATTACHMENT FOR PERFORMANCE CAPTURE, filed on Nov. 30, 2020 (WD0032US4), which are hereby incorporated by reference as if set forth in full in this application for all purposes.

FIELD OF THE INVENTION

The present disclosure generally relates to visual productions and more particularly to active marker apparatuses for performance capture systems.

BACKGROUND

Many visual productions, such as movies, videos, clips, and recorded visual media, combine real and digital images to create animation and special effects. For example, a visual production may employ performance capture systems to detect shapes, movements, and facial expressions, of a live actor on a location shoot and produce a realistic-seeming computer-generated ("CG," "virtual," or "digital") character.

In performance capture (or "motion capture"), tracking markers are attached to physical objects in a live scene. Light from the markers are recorded to establish position, orientation, and movement of the objects. Active markers are a type of marker having light source(s) that emit light of specific wavelengths, e.g. infrared, detectable by particular camera devices. In one animation technique, the information gathered from active marker detection is processed and mapped to a 3-D model to create a CG representation.

Recording of live action can require many costly "takes" if a shot is not right. A malfunction in the equipment may mean more time and money spent in its repair or replacement during the shoot. During a live action shoot, markers on objects are susceptible to being damaged. Markers may slip from their positions on an object, be subjected to destructive forces, be exposed to environmental elements, etc. The live action shoot may occur in various settings and under a variety of conditions, which can include potential exposure to moisture, mud, sand, dust, etc. For example, a shoot may require an actor to be at least partly immersed in water. Such hazardous conditions can cause malfunction or otherwise shorten the life of electrical components of a marker. It is important to prevent mishaps from occurring with the performance capture equipment during live action recording to ensure proper recording of active marker data.

SUMMARY

Implementations of this application relate to a sealed active marker apparatus of a performance capture system, which includes a protective housing for an active marker light component that emits light for detection. The present active marker apparatus enables active marker light components to be shielded from potentially hazardous conditions and attached to objects.

The sealed active marker apparatus comprises an active marker light component coupled to a strand and a receptacle to house the active marker light component. Components of the receptacle include: (1) a protrusion portion having at least one section that is transmissive (i.e. possesses transmissivity) to at least one particular wavelength range of light emitted from the active marker light component, (2) a base portion coupled to the protrusion portion, and (3) a bottom plate interlocking with the base portion to retain the active marker light component. The base portion has one or more upper channel sections. The bottom plate also has one or more lower channel sections that correspond with the one or more upper channel sections to forming one or more assembled channels to receive the strand. The receptacle includes a sealant material covering at least a portion of the receptacle. In some implementations, the upper channel sections and/or the lower channel sections may include channel bumps for engaging the strand.

Various implementations and examples of the apparatus are described. For example, in some implementations, the bottom plate and the base portion are fixed together by a plurality of pegs on the bottom plate and a plurality of holes to receive corresponding pegs on the base portion. In order to provide protection for the components, a sealant material may cover one or more port areas at an external end of the one or more assembled channels, and further cover at least a segment of the strand extending from the one or more assembled channels. In some implementations, the base portion and the bottom plate may include a plurality of corresponding pores and the sealant material may be embedded into the plurality of corresponding pores. To further encase the active marker component in the receptacle, base portion and the bottom plate may be fused together along a seam line, creating a single receptacle unit including the protrusion portion, base portion, and bottom plate.

In some implementations, an exterior surface of the strand includes a plurality of spaced adhesive elements for adhering to an outer surface of a wearable article. The strand may also include an interior wire extending from the active marker component to a control unit. A control unit may be coupled to a proximal end of the strand and in electrical communication with the active marker light component. In some implementations, the protrusion portion may include a first color that is distinct from a second color of an outer surface of a wearable article. The active marker light component may be configured to emit multiple wavelengths of light.

In still some implementations, an example of a method may be provided for making an active marker apparatus for a performance capture system. The method encompasses injection molding a receptacle that has a top component including a protrusion portion and bottom portion, and a bottom plate. The protrusion portion has at least one section configured to be transmissive to at least one particular wavelength range of light emitted from an active marker light component. The base portion includes one or more upper channel sections and the bottom plate has one or more lower channel sections corresponding with the one or more upper channel sections. The one or more lower channel section and one or more upper channel sections, when placed together, form one or more assembled channels. An active marker light component coupled to a strand may be positioned onto a platform of the bottom plate. The strand that is coupled with the active marker light component is installed into the lower channel sections and/or upper channel sections. The base portion and the bottom plate are interlocked together, e.g. by fusing, to secure the active marker light component and the strand between the base portion and the bottom plate, forming the assembled channels. A sealant is applied to various portions of the active marker apparatus, such as at least a portion of the receptacle and at least a portion of the strand.

In various implementations of the method, a plurality of pegs in the base portion may be inserted into a plurality of corresponding holes in the base portion. In some aspects of the method, the sealant material may be applied to one or more port areas at an external end of the one or more assembled channels, and at least a segment of the strand extending from the one or more assembled channels. In some implementations, the strand is engaged into at least one of the lower channel sections by engaging the strand with one or more bumps in the lower channel sections to inhibit movement of the strand.

The method may also include applying a plurality of adhesive elements on the strand and the receptacle for adhering to an outer surface of a wearable article. Furthermore, a proximal end of the strand may be electronically coupled to a control unit.

In some implementations, a performance capture system is provided that includes a plurality of active marker light components coupled to a strand and a plurality of receptacles corresponding with the active marker light components. The receptacles each comprise a protrusion portion, a base portion coupled to the protrusion portion, and a bottom plate interlocked with the base portion including a platform to retain the active marker light component. The protrusion portion has at least one section that is transmissive to at least one particular wavelength range of light emitted from the active marker light component. The base portion has one or more upper channel sections. The bottom plate may include a platform for receiving the active marker light component and also has one or more lower channel sections that correspond with the one or more upper channel sections forming one or more assembled channels that contain the strand. The receptacle includes a sealant material covering at least a portion of the receptacle. At least one sensor device is provided to detect light emitted from the plurality of active marker light components.

The performance capture system may further include a control unit in electrical communication with the strand. In some implementations, a signal controller may be provided for transmitting signals to the control unit to indicate a pulse rate for emitting of the light by the active marker light component. In some implementations, the protrusion portion may have a distinct color and the system further comprises a camera device to detect the color.

A further understanding of the nature and the advantages of particular embodiments disclosed herein may be realized by reference to the remaining portions of the specification and the attached drawings.

BRIEF DESCRIPTION OF THE DRAWINGS

Various embodiments in accordance with the present disclosure will be described with reference to the drawings, in which:

FIG. 8 is a flowchart of an exemplary method of making a sealed active marker strand, in accordance with some implementations.

DETAILED DESCRIPTION

Figure 1:
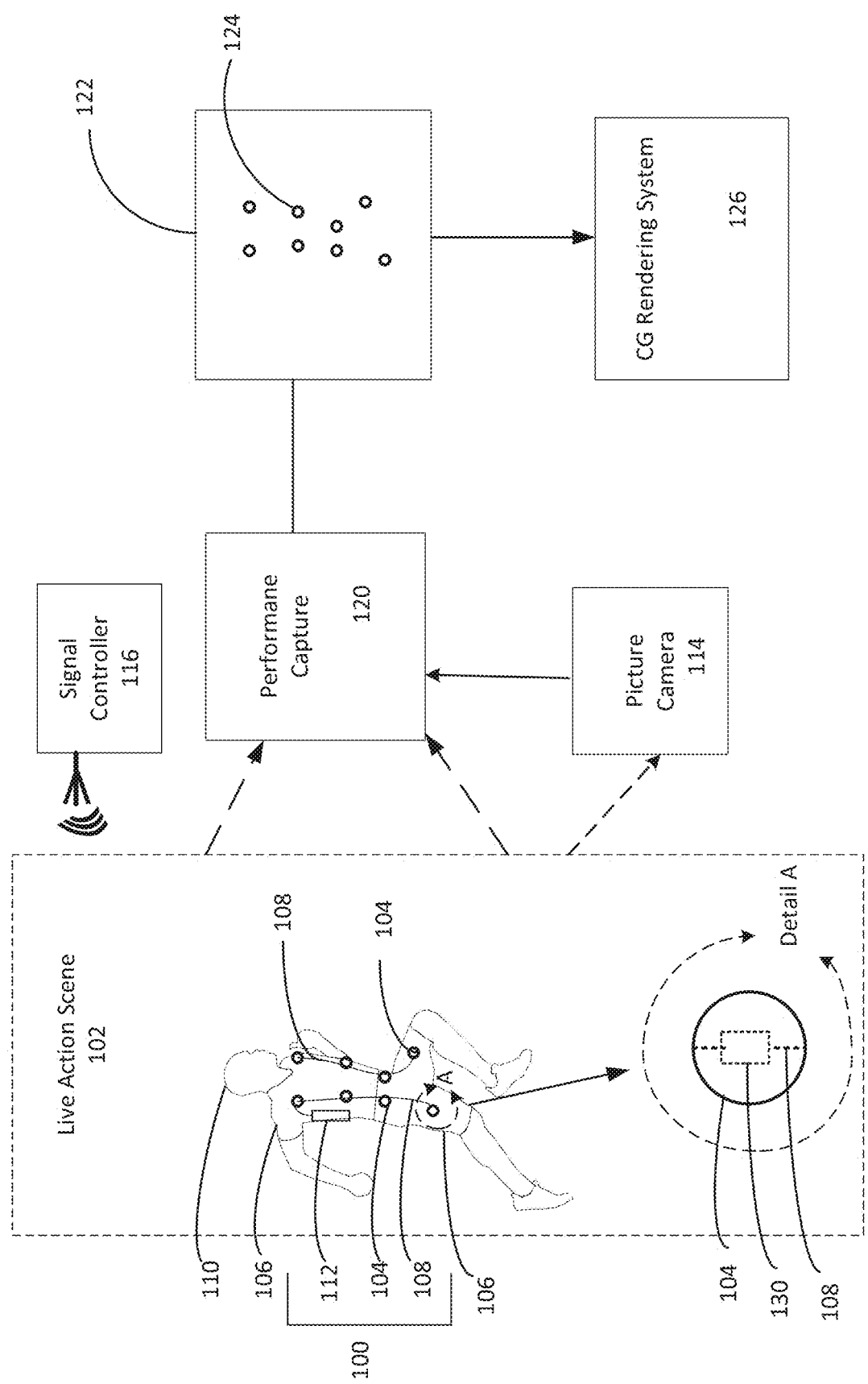
FIG. 1 is a conceptual diagram illustrating exemplary imagery of light signals from a plurality of active marker light components on a person, in accordance with some implementations.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A sealed active marker apparatus of a performance capture system attached to an object in a live action scene is described to provide protective housing for active marker light components, a strand that couples the active marker light components, and other associated components. The present sealed active marker apparatus employs an active marker light component that is enclosed in a receptacle and emits at least one particular wavelength range of light. The receptacle has a protrusion portion that permits the wavelength(s) of light coming from the active marker light component to diffuse in a manner that enables easy detection by at least one sensor device, e.g. camera. The active marker light component is insulated within the receptacle, from potentially disruptive environmental factors. A base portion interlocks with a bottom plate of the receptacle to secure the strand within one or more channels. A sealant material on the receptacle further promotes a protective environment for the active marker light component.

A user of the performance capture system employing the present sealed active marker apparatus might be a person who contributes to the making of the visual production. For example, the user may include an individual at the live action shoot, such as a director, a cinematographer, an on-location crew member, an actor, a special effects person, etc. The user may also include an individual responsible for animation of the visual production, such as an artist, a graphics manager, etc.

For the purposes of the present discussion, an object in a live action scene that bears the active marker light components may be any physical object that can receive one or more receptacles. For example, objects can include persons (such as actors), inanimate items (such as props), animals, parts of an object, etc. In some implementations, the object may have on a wearable article to which the sealed active marker apparatus may be attached. The wearable article bearing the active marker light components may be any item covering at least a portion of the object in the live action scene, such as a garment, shoe, accessory, hat, glove, strap, cover, etc. For example, the wearable article may be a skin-tight suit made of elastic fabric. In various implementations, the sealed active marker apparatus may be attached directly to the object, entirely on a wearable article, or include parts attached to a wearable article and parts attached directly to the object.

An actor may be equipped with multiple active marker light components in individual receptacles and attached to various locations on the object and/or wearable article with groups of active marker light components being connected by one or more strands for convenient roll out of groups of active marker light components. Some prior systems include markers that are individually mounted onto an actor, taking time away from shooting of the scene.

Performance capture systems provide a valuable tool to generate data in a live action shoot for animation specialists to use. Live action shoots are typically expensive to run and delays can add significantly to the overall cost of the production. It is desirable for the equipment used in performance capture to be durable when exposed to a wide range of environmental elements and physical forces.

Active marker light components being worn by an object, e.g. an actor, are fraught with the potential for damage. During a production shoot without the present sealed active marker apparatus, active marker light components may be potentially exposed to moisture. For example, the scene may require the object to be at least partly immersed in water, the object may sweat during the filming, or the shoot may take place under adverse environmental conditions, e.g., rain, snow, humidity, fog, mist, smoke, mud, dust, sand, etc. For example, an actor may need to trudge through a swamp during a shoot. An electronic malfunction in equipment may mean more time and money spent in its repair during the shoot. The present sealed active marker apparatus provides protection from these exemplary hazardous conditions including liquids, gases, and solids that may otherwise corrode or interrupt precision or the viability of the sealed active marker apparatus. The present sealed active marker apparatus may also protect the components from high or low environmental pressures, such as in shooting of deep water scenes. Furthermore, the present sealed apparatus may be washed between shoots to prolong the life of the apparatus.

Often visual productions involve much action on the part of an object. For example, an actor may need to run, jump, crawl, fight, etc. in a scene. Actors need to be able to move freely without restriction by the performance capture equipment. Active markers on live actors/objects can undergo stresses that may result in the active markers becoming dislodged from its position on a wearable article and/or object. Various implementations of the present sealed active marker apparatus include a variety of fasteners suitable for many given circumstances of a live action shoot to ensure the active marker light component stays securely in place and permits movement. For example, a strand may include spaced adhesive elements that enable the strand to be weaved onto less restrictive moveable parts of the wearable article/object.

Light presented by active marker light components of the present sealed active marker apparatus is projected at various angles for detection. In addition, some implementations include secondary detection sources, e.g. colored and/or specifically shaped parts, which can serve as additional points of detection by different camera devices.

Other benefits of the sealed active marker apparatus will be apparent from the further description of the system, as described below.

Various components of a visual production system include (1) live action components such as the present performance capture system for generating visual data from a live action scene, (2) virtual production components for generating CG graphic information based on the visual data, and (3) content compositing components for generating output images. Any of the system components may communicate with the other components through a network or other data transfer technologies.

As shown in FIG. 1, a performance capture system 120 is employed to detect light diffused from a sealed active marker apparatus 100. The sealed active marker apparatus 100 includes a plurality of active marker receptacles 104 encasing respective active marker light components 130 positioned in a chamber of the active marker receptacle 104 (as shown in the view Detail A). Groups of active marker light components 130 may be coupled, e.g. electronically coupled, to strands 108, which may be positioned on an outer surface of a wearable article 106 and/or directly to a person 110. For example, each strand 108 may extend from a control unit 112 to electronically control and sync the pulsing of light by the active marker light components 130. The active marker receptacles 104 may be configured to attach to wearable articles 106 (a shirt and pants) on a person 110 in a live action scene 102. In some implementations, some active marker receptacles may be positioned directly on the person 110, such as with adhesive, rather than on the wearable article 106.

The live action scene 102 defines the space available for recording and may include a motion production set, a performing stage, an event or activity, a natural outdoor environment, etc. The active marker light components 130 emit light that diffuses from the active marker receptacles 104 for detection by the performance capture system 120.

The light source of the active marker light component 130 may be infrared LED between 700 nm and (850 nm). In some implementations, a different wavelength of light or filters, or combinations of different wavelengths may be used for various different markers in a scene, under various conditions, such as fog, and based on a resolution and optical contrast required to produce the data needed by the CG rendering system 126 for animation. For example, active marker light components that emit blue wavelength light may be used for high moisture or water settings. The active marker light component 130 may include one or more light sources, such as an LED or an array of a plurality of LED's (e.g. a bundle of three LED's).

Any frequency of electromagnetic radiation may be selected for an active marker light component to emit. For example, a particular wavelength range of light may be selected within various types of visible light and non-visible light, such as infrared, ultraviolet radiation, etc.

In some implementations, a receptacle 104 may include a multi-band emitter by which the active marker light component 130 within the receptacle may be configured to emit various wavelengths ranges of light at any given time. For example, an active marker light component may include a plurality of light sources that are configured to emit a different wavelength of light. Control signals may be provided, such as via the signal controller 116, control unit 112, or in response to condition sensors on the sealed active marker apparatus, for the active marker light component to emit a particular wavelength of light at one time and to emit a different wavelength of light at a different time. In some implementations, a multi-band emitting active marker light component may emit various wavelengths of light at the same time via different light sources or filters within the active marker light component, e.g. infrared and visible light sources.

In some implementations, the signal controller, control unit and/or receptacle may include a conditions sensor to determine environmental conditions in which a particular wavelength of light is favorable or unfavorable, such as due to interfering environmental lighting. The active marker light component may automatically generate the favorable wavelength of light based on conditions detection by the environmental sensor. One benefit of multiple-band emitters may be when conflicting light is present on a set e.g. environmental light, that interferes with some wavelengths of light of an active marker light component. Multi-band emitters may also provide information about the active markers, such as location, 3-D direction the marker is facing, identification of the active marker and/or object, etc.

In some implementations, a receptacle may house multiple active marker light components in which each active marker light component emits a different wavelength range of light. In some implementations, a strand 108 may include various active marker light components that generate different wavelength ranges of light. In still some implementations, a wearable article 106 may include multiple strands 108, with the various strands devoted to active marker light components emitting a different wavelength range of light than other strands.

The pulsing of light by the active marker light components 130 may be controlled by a signal controller 116 sending signals to a control unit 112 electronically coupled to the strands 108. In some implementations, a pulse rate may be preset and may or may not require a signal controller 116.

A performance capture system 120 includes a sensor device, e.g. a camera configured to capture at least one particular wavelength light from the active marker light components. In some implementations, one or more cameras of the performance capture system 120 may include a visible light filter to block visible light and allow only particular wavelengths of non-visible light to be detected by the sensor device. The sensor device may include various types of cameras, such as a computer vision camera and mono-camera that is sensitive to infrared light (700 nm to 1 mm wavelength light), e.g., that exclude infrared blocking filters.

In some implementations, an image capture device image capture device 114 may also be included to capture visible light, such as a color and/or shape of the receptacles 104. In some implementations, the image capture device 114 and performance capture camera may be synchronized. Data from the image capture device 114 and the performance capture camera may be combined to determine a marker arrangement 122. The performance capture system determines the marker arrangement 122 from data 124 representing positions of the detected markers. The marker data from the image capture device may also be used to match CG parameters for CG images with image capture device parameters, such as perspective, position, focal length, aperture, and magnification, of the CG images. In this manner the CG images may be created in an appropriate spatial relationship with the live action objects.

The performance capture system 120 feeds marker data obtained from the detection of the active marker light components in the receptacles 104 to the CG (computer graphics) rendering system 126 to be mapped to a virtual model using software of the CG rendering system 126. The CG rendering system 126 may represent the data in a virtual environment. For example, computer programs may be used by CG rendering system 126 to overlay information on top of movements of the actor 110 represented by the data.

The CG rendering system 126 may include computer processing capabilities, image processing capabilities, one or more processors, program code storage for storing program instructions executable by the one or more processors, as well as user input devices and user output devices (e.g., animation and rendering components of system 1000 described below with regard to FIGS. 9 and 10).

Signal controller 116 may communicate with control unit 112 to direct the active marker light components 130 to emit light at a particular pulse rate, or may communicate directly with a wireless active marker light component having an onboard receiver. In some implementations, the signal controller 116 emits radio frequency signals to receivers on control unit 112 that is wire or wirelessly coupled to the active marker light components. In some implementations, signal controller 116 may release signals to direct an action by the performance capture system to drive capture at the same time as the pulse of light from the active marker light components. The pulse rate of light emitted from the active marker light component 130 may be in synch with global shutter signals and according to the signal controller 116. For example, the pulse rate may be calibrated to be consistent with the detection camera exposure time so that light is emitted only when the camera shutter is open. The use of a pulse rate rather than constant emitting of light may provide a benefit in reducing energy needs and battery life. The light may not be emitted when a camera shutter is closed and light is undetected.

The active marker light component may be placed at a distance that enables receiving of signals by the active marker light component from the signal controller 116 and detection of light by the detecting camera, e.g. performance capture system 120 from the active marker light component. For example, the active marker light component may be located up to 50 m from the signal controller 116.

Use of active marker light components in the present performance capture system offers benefits over passive-type markers, such as increased sensitivity and reduced energy requirements. For example, some systems that employ reflective markers use a camera as a light source, such as a ring light with infrared LED light. The light source on the camera may emit light when the shutter of the camera opens at the time of a synch pulse. The markers have reflective material that reflects the received light back to the camera for detection.

Active marker light components enable improved detection of light over other reflective marker technology. For example, when using reflective markers in an outdoors scene, environmental light may interfere with detection of the reflected light. The reflected light may decrease with the square of distance. For example, in situations in which a marker is placed at 10 m from a detection camera, assuming 100% of light is reflected, the amount of light reflected may drop off 100 times as it travels to the detection camera. Performance capture systems that use active marker light components do not experience such extensive distortion of received light.

In addition, the active marker light component may also use less power than reflective markers. Light emitted from an active marker light component is only required to travel one way from the marker to the detection camera, rather than the light traveling two-ways from the light source to a reflective marker and back to the camera.

In some implementations, one or more active marker light components 130 may be electronically coupled to strand 108 by one or more wires of the strand extending from the active marker light components. In various implementations, the strand 108 may include one or more wires that run inside the length of a flexible tube or sleeve, e.g. in a conduit in the strand, heat shrink tubing, protective wrap or tape, coating over the wires, etc. Other forms of the strand may be possible for wired communication between the control unit and the active marker light components, e.g. to control pulsing of light be the active marker light component via the control unit, and/or for supplying power to the active marker light components. For example, particular wires may be dedicated for power, control data lines, and ground. In some implementations, the strand may be one or more wires, e.g. bare wires, embedded within a protective material of the wearable article. The strand and receptacles may be attached to an exterior surface of the wearable article. Further, in still some implementations, at least portions of the strand may be provided on an interior surface or flap of the wearable article.

In some implementations, the strand may include multiple connecting segments between active marker light components. The connecting segments may be attached to each other through a fastening device, such as prong and hole connectors. The point of attachment of the connecting segments may include a seal, e.g. tubing, locks, etc., to ensure moisture and other environmental elements, e.g. do not infiltrate the inner strand. The connecting segments may be detachable to swap out particular connecting segments. For example, if an active marker light component or receptacle needs to be swapped out, the strand may be detached at the connecting segments and a replacement receptacle/active marker light component may be inserted.

In some implementations, wireless active marker light components may be employed that are independently controlled with an on-board input/output interface to receive wireless synchronization signals via a wireless format, such as from signal controller 116 and/or control unit 112. The wireless active marker light component may also include logic. In these implementations, the active marker light component apparatus may not use a strand for electronical control of or supplying power to the active marker light components. Such wireless active marker light components may be coupled to one or more strands for mechanical attachment to the receptacle via channels, and not for electronic communication. For example, the one or more strands may be non-conductive rigid, semi-rigid, or flexible connectors to the active marker light component, or extensions of the active marker light component, to engage with the channels of the receptacle as described below. In still some implementations, the active marker apparatus that uses wireless active marker light components, e.g., with a self-contained battery source and wireless communication receiver, may exclude a strand.

The visual production system in FIG. 1 is a representation of various computing resources that can be used to perform the process actions and steps described herein. Any number and type of discrete or integrated hardware and software components may be used. The components may be located local to, or remote from the other system components, for example, interlinked by one or more networks.

Figure 2A:
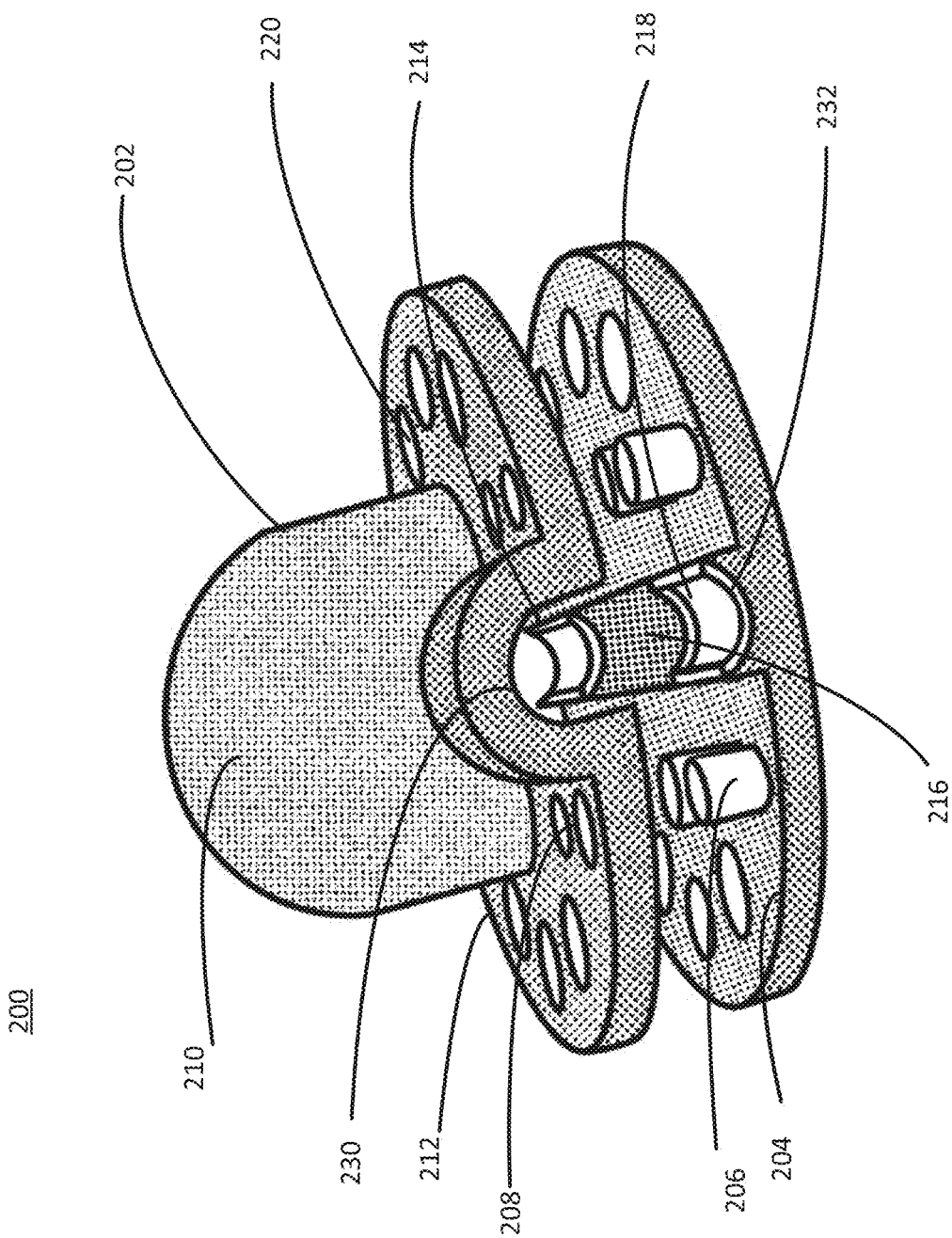
FIG. 2a is an exploded view of an exemplary sealed active marker receptacle with a top component and bottom plate, in accordance with some implementations.

As shown an example in FIGS. 2a (exploded view) and 2b, a receptacle 200 is provided for housing an active marker light component (as in item 130 in FIG. 1). As shown in the exploded view of the receptacle 200 in FIG. 2a, a top component 202 and a bottom plate 204 may include connection members to assist in the top component and bottom plate attaching to each other. For example, the bottom plate 204 may include one or more pegs 206 that correspond with one or more holes 208 of a base portion 212 of the top component 202, such that each peg and its corresponding hole align when the top component and bottom plate are attached.

The peg 206 may project from an upper surface of the bottom plate toward the base portion 212 when the bottom plate 204 is attached with the base portion 212. The shape and diameter of the peg may be a similar or same shape and a similar (e.g. slightly smaller) diameter as its corresponding hole 208 of the base portion 212, such that the peg fits snugly within the hole. The height of the peg may be at least the same as, or similar to the height of the corresponding hole and/or thickness of the base portion. In this manner, the peg may extend to the top surface or beyond the top surface of the base portion when the top component and bottom plate are interlocked together. The pegs and hole may be any size and shape to allow for mating and alignment of the connection members.

Different types of connection members are possible. For example, connection members may include screws, rivets, pins, and other mechanical fasteners to attach the base portion and bottom plate.

Any number of pegs 206 and corresponding holes may be provided for engagement of the base portion 212 with the bottom plate 204. For example, in some implementations, two sets of pegs 206 may flank each side of a lower channel section 216 (described below) of the bottom plate 204 and two sets of corresponding holes 208 may flank each side of an upper channel section 214 (described below) of the base portion 212. Such connection members that flank the channels may assist in creating a tight union between the upper channel section 214 and lower channel section 216 to form an enclosed assembled channel when the base portion 212 and bottom plate 204 are joined by engaging the connection members, e.g. by inserting the pegs into the corresponding holes.

In some implementations, the pegs 206 as described may be included on the base portion 212 and the corresponding holes as described may be provided on the bottom plate 204. In some implementations both the base portion 212 and the bottom plate 204 may include one or more pegs and holes, which correspond with holes and pegs of the other piece.

The base portion 212 of the top component 202 may include one or more upper channel sections 214 that correspond with one or more lower channel sections 216 of the bottom plate 204. An upper channel section 214 may extend from an upper port section 230 to the chamber of the top component 202. Another upper channel section may extend from the chamber to an exit port section (not shown).

When the base portion 212 and bottom plate 204 are joined, the upper channel section 214 and corresponding lower channel section 216 form an assembled channel, as described below with regard to FIG. 2b. Furthermore, upper port section 230 and lower port section 232 form an assembled port, as described below with regard to FIG. 2c.

Figure 3A:
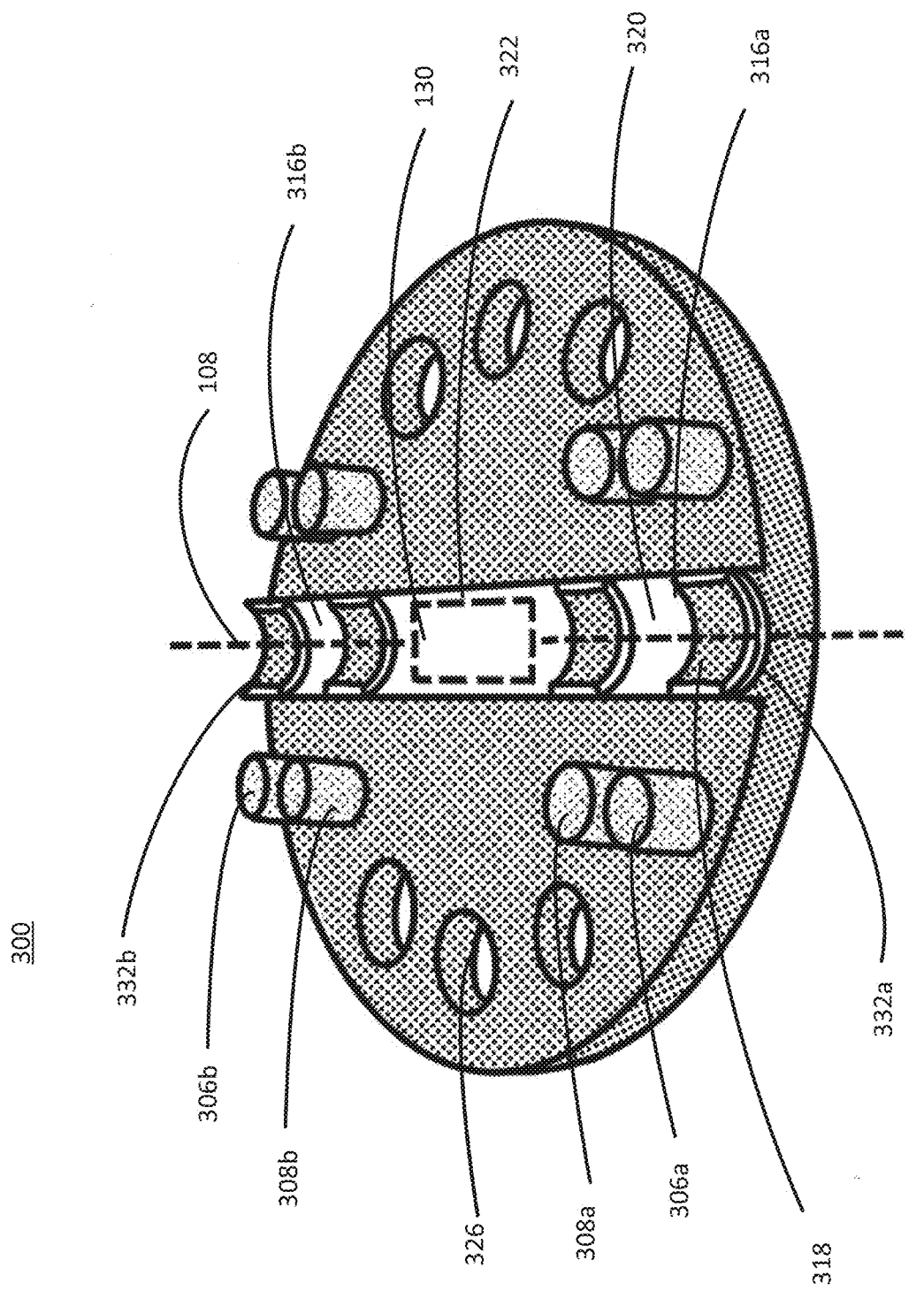
FIG. 3a is a view of the topside of an exemplary bottom plate of a sealed active marker receptacle, in accordance with some implementations.
Figure 3B:
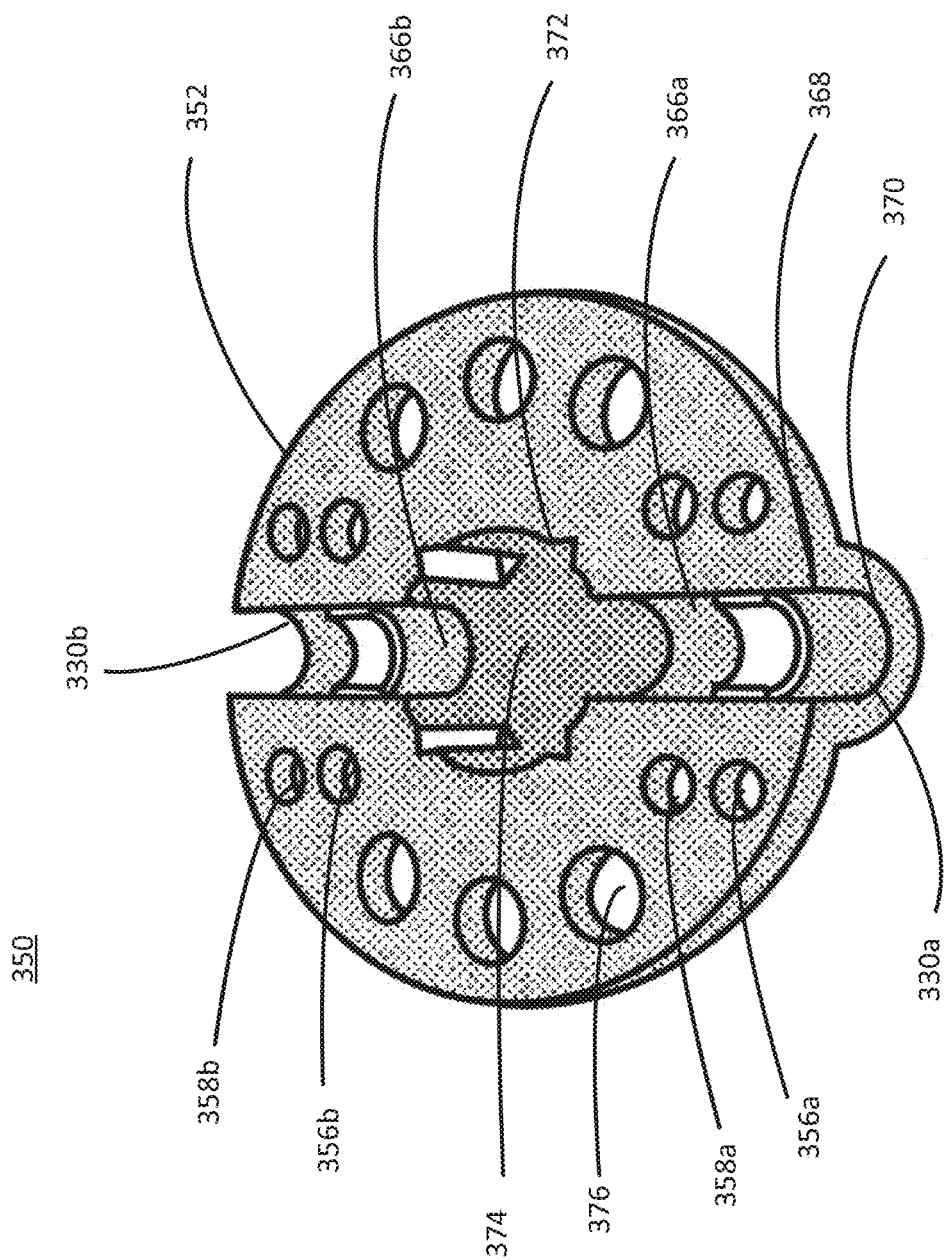
FIG. 3b is a view of the underside of an exemplary top component including a base plate, in accordance with some implementations.

In some implementations, the base portion 212 and bottom plate 204 include one set of channel sections 214, 216 that form an entrance channel extending from an entrance port (as shown in FIGS. 3b and 3c) (comprised of an upper port section 230 an lower port section 232) into a chamber of the protrusion portion when joined. Another set of channel sections 214, 216 form an opposing exit channel extending from the chamber to an exit port (comprised of another upper port section 230 and lower port section 232) when joined. In some implementations, the receptacle may include a single assembled channel.

In some implementations, the assembled entrance channel and exit channel may be positioned at opposite ends (180 degrees apart) of the receptacle, such as mirror images of each other. In other implementations, the assembled entrance channel and exit channel may be positioned at different angles with respect to each other, such as 90 degrees, 45 degrees, etc. The channels may be slanted between the entrance/exit ports and a platform for the active marker light component (such as 322 in FIG. 3a described below). For example, two opposing slanted channels may be slanted in the same direction at less than a 90 degree angle from each other to create an angled pathway, in which the strand enters and exits the receptacle.

The lower channel sections and/or the upper channel sections may include a resistance element, such as one or more bumps 218 that engage with the strand and hinder movement by the strand. A snug fit of the strand within the channel immobilizes the strand and active marker light component, preventing displacement within the receptacle. The bumps 218 may be horizontal bulges on the floor of the channel lower channel sections and/or ceiling of the upper channel sections. In some implementations, floor bumps and ceiling bumps may be in alternating positions with regard to corresponding bumps. For example, when the receptacle components are coupled together, the floor bumps fit between adjacent ceiling bumps in the assembled channel. In some implementations, the bumps 218 may be located in various placements inside of the channels, such as vertical ridges that line the interior of the channel sidewalls.

The bumps 218 may be any shape or size to reduce slippage of the strand, such as a channel ridge. In some implementations, the resistance element may include a corrugated surface of the channel, a rough material, primer or other bonding agent, and other surface textures that may assist in restraining the strand within the channel.

The top component 202 of the receptacle 200 further includes a protrusion portion 210 that extends from the base portion 212 away from the bottom plate. The protrusion portion 210 may be any various shapes. Often the protrusion portion 210 may be convex such as a hemispherical or dome shape. Other shapes are possible, such as other three-dimensional shapes, e.g. prism, cone, cylinder, plateau, etc., that may permit light diffusing from the protrusion portion to be detected by sensors in the live action scene. The shape and size of the protrusion portion may define an interior chamber to fill with light from the active marker light component. The protrusion portion may also provide for controlled disbursement of light, e.g. based on the protrusion portion shape, size and levels of transmissivity of particular surface sections of the protrusion portion. In some implementations, the protrusion portion may be a flat surface that is transmissive to at least one wavelength of light emitted from the active marker light component.

An interior surface of the protrusion portion 210 may define, at least in part, a chamber that creates a gap space between the active marker light component residing in the bottom plate 204 and the interior surface of the protrusion portion 210. In some implementations, the protrusion portion may include various interior walls to define the chamber and direct the light to particular transmissive surface sections of the protrusion portion for radiating of light. In some implementations, the gap may be between about 15 mm to 25 mm, such as about 18 mm. Other gap heights are possible.

The gap allows light emitted from the active marker light component to fill the gap space and diffuse through transmissive section(s) of protrusion portion 210. In some implementations, the entire protrusion portion is transmissive, increasing a directional range to detect the light. For example, light emitted from an active marker light component on a wearable article without the protrusion portion of the receptacle, may be detectable within a limited field of view, such as 60 degrees of view. With the use of the gap in the protrusion portion such as a dome-shaped protrusion, for example, the angle of detection may increase to beyond 180 degrees, such as 270 degrees or more. The ability to detect light from the active marker light component from a variety of angles to the performance capture camera assists in live action shoots in which an actor moves in various ways with respect to the camera position. Without the increase angle of detection and with a limited range of visibility, the sensor device, e.g., camera, may need to remain in front of the object and active marker light components to detect the light. The entire surface of the protrusion portion may be transmissive to any type of light and providing a maximum viewing area to detect light coming from the active marker light component. The active marker light component may include one or more light sources dedicated to particular wavelengths of light and/or include one or more filters that limit the wavelength of light being exposed to the chamber and diffused from the protrusion portion.

The protrusion portion may also be selectively transmissive to the wavelength of light coming from the active marker light component and non-transmissive to other wavelengths of light. Thus, the protrusion portion may serve as a filter to different wavelengths of light being passed through the receptacle and which the sensor device detects. In this manner, light sources that emit wide bands of wavelengths of light, e.g. white light emitting diode (LED) with red, green, blue emittance (RGB), may be employed and the light filtered for specific wavelengths by the protrusion portion.

In some implementations, e.g. where a different detection area of light is desired, such as a concentrated narrow point of light, the protrusion portion may have a different shape resulting in various sizes of gap in the chamber, including no gap. In some implementations, one or more dedicated surface sections of the protrusion portion may be transmissive to the light from the active marker light component and other surface sections being opaque and impenetrable to the light. The dedicated surface sections may be shaped and sized to create a particular spread of light for specific sensor devices to capture. Certain shapes of viewing areas may further enable the performance capture system to distinguish between particular active markers having different viewing area shapes and/or differentiate the active markers from background light. Particular shapes of sections of the protrusion portion may further be used to direct light away from potentially interfering sources, such as reflective surfaces on the wearable article or the object, e.g. eye glasses.

In some implementations, the receptacle may further include a focusing component, a defocusing component or various filters to control how the light is dispersed from the protrusion portion.

In some implementations, multiple surface sections may be provided on a protrusion portion having transmissivity to different wavelengths of light, thus accommodating a multi-band active marker light component that is configured to emit various wavelengths of light. For example, a first section of a protrusion portion may be transmissive to infrared light and a second section may be transmissive to ultraviolet light. In this manner, sections of the protrusion portion may provide filtering effects for different types of light. Dedicated sensor devices may be configured, e.g. with filters, to capture the different wavelengths of light.

In some implementations, certain receptacles may release a first wavelength of light in one direction (e.g. forward) from a section of the protrusion portion and a second wavelength of light in a different direction (backward) of the protrusion portion. Such split receptacles may be used to determine an orientation of the active marker by sensor devices capturing the distinct lights coming from different directions of the receptacle.

The protrusion portion, or particular sections of the protrusion portion, may be composed of a material that is transmissive to a particular range of wavelengths of light that is emitted from the active marker light component, such as transparent and/or translucent material. For example, various components of the receptacle may be plastic injection molded, 3-D (3-dimensional) printed with a plastic resin, etc. The protrusion portion may be a translucent or transparent color. In some implementations, the material is transmissive to infrared wavelength light, such as near-infrared light. In some implementations, the material transmits light in a range of about 750 nm to 1 mm wavelength, particularly 750 nm to 2500 nm, and more particularly 800 nm to 900 nm, such as about 850 nm. In some implementations, the protrusion portion may be transmissive to a range of blue wavelengths of light. Other wavelengths are possible depending on particular conditions of the shoot. The transmissivity of a particular wavelength or range of wavelengths of light by the protrusion portion depends, at least in part, on the wavelength(s) of light emitted from the active marker light component in the respective receptacle.

In some implementations, in addition to diffusion of light from the active marker light component, the protrusion portion 210 may also serve as a physical marker for supplementary active marker tracking and/or for identification of particular active marker light components. The protrusion portion 210 may include a color detectable by a visible light camera and still permits sufficient transmissivity of the particular wavelength of light from the active marker light component through the protrusion portion to be detected by the performance capture sensors. The color e.g., orange or yellow, of the protrusion portion 210 may be distinct from the color of other portions of the sealed active marker apparatus, e.g. the base portion of the receptacle, the strands, a color of the wearable article near the placement of the receptacle, etc. Use of distinct colors, such as contrasting colors (or complementary colors, at or near opposite ends of a color wheel) and intensity of the color of the protrusion portion 210 may enhance detection of the protrusion portion 210. In some implementations, the cap color may be a dominant hue and/or saturated color. The color may also include a glow-in-the-dark substance, such as phosphor, or other substance that enables night time visibility.

In situations in which there is sparse coverage of infrared light detectable from the active marker light component, visible light detection can assist in tracking the receptacle. In still some implementations, where detection of the marker is not needed, the protrusion portion 210 may be a muted color that blends with the color of the other portions of the sealed active marker apparatus and/or wearable article.

In still some implementations, the shape of the protrusion portion 210 may be used by a visible light camera for detection, instead of, or in addition to a distinct color of the protrusion portion 210. For example, the protrusion portion 210 may be a circular shape and the picture camera may detect items in the scene that have the particular circular shape.

In some implementations, the base portion 212 and bottom plate 204 may comprise one or more corresponding pores 220 to assist in adhesion of a sealant material, to the receptacle. The upper pores 220 of the base portion and lower pores 220 of the bottom plate may align when the top component is fit with the bottom plate. The sealant material is embedded within at least part of the upper and lower pores. In some implementations, a plurality of aligned upper and lower pores 220 may be provided, spaced along the perimeter of the top surfaces of the base portion and bottom plate, such as three pores on each side of the top surfaces divided by two opposing channels. The area of the channels may be void of the pores.

The sealant material may create a waterproof or other protective encasement for the receptacle, active marker light component and strand. The sealant material may include one or more coatings of polyurethane, a rubber sealant, and other protective materials that have elastomeric properties and tensile strength to permit flexibility of the strands of the sealed active marker apparatus. For example, the sealant material may be a cold castable polyurethane elastomer with a Shore A hardness scale of 50 (e.g. as tested with a durometer). Other properties of the sealant that may be beneficial include high load bearing properties in both tension and compression, a high shear load bearing capacity, high tensile strength, high modulus, high tear strength, high resilience, e.g. 40-65% rebound value, resistance to cracking under repeated flexing, flexible at very low temperatures, e.g. 0 degrees Celsius (32 degrees Fahrenheit), resistant to the effects of water immersion, e.g. low water absorption, good insulating properties, bonding ability to surfaces, etc. One or more layers of liquid elastomer of a suitable grade and consistency may be cured and used to provide ample stiffness, allowing for flexibility of the strand, and durability. Other types of sealant materials that provide for waterproofing and/or environmental resistant shields, such as films, coverings, enclosures, etc. are possible.

Figure 2B:
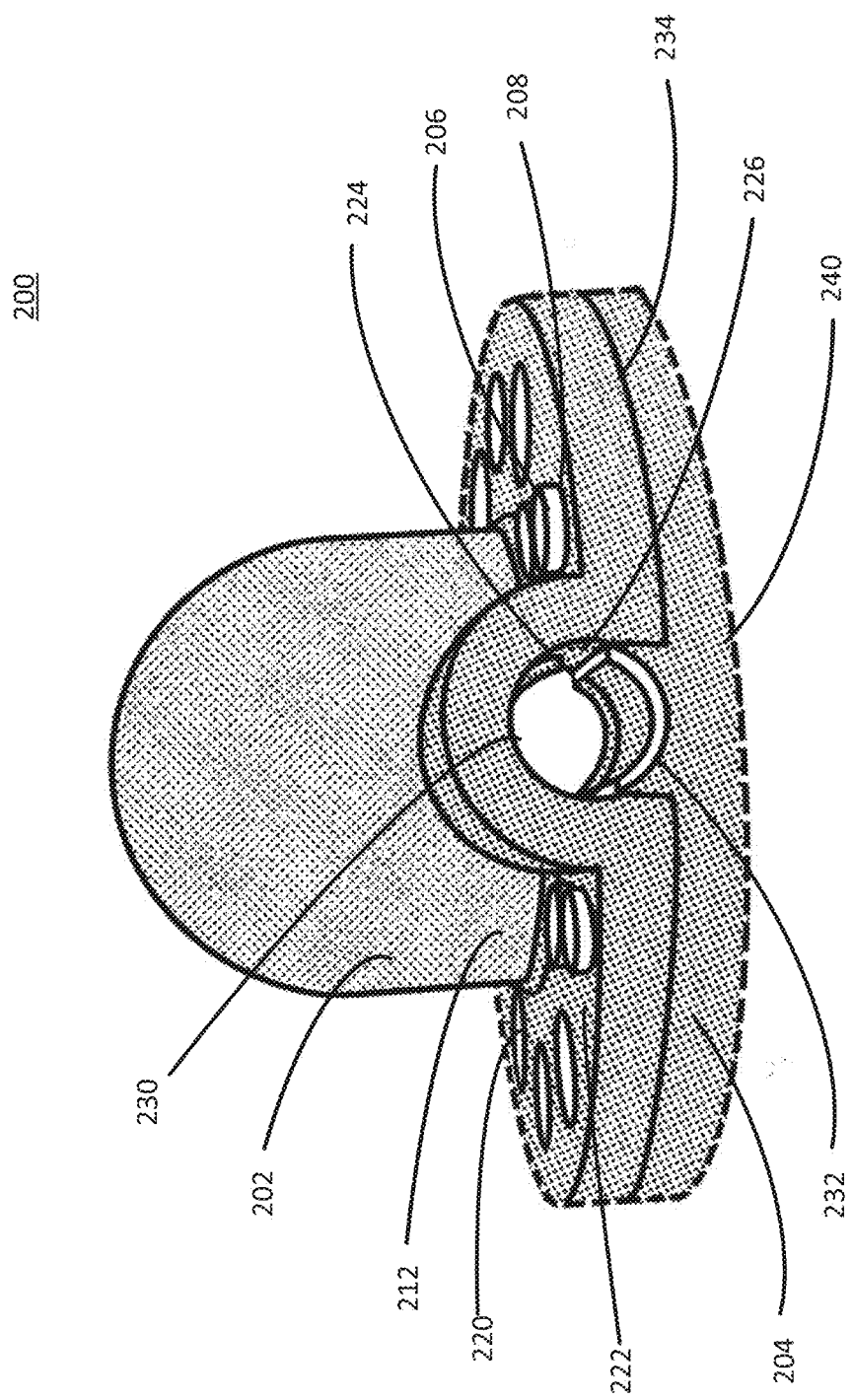
FIG. 2b is a side perspective of an exemplary sealed active marker receptacle with a top component attached to a bottom plate, in accordance with some implementations.

FIG. 2b shows a side perspective of the receptacle 200 having a top component 202 joined with a bottom plate 204. In some implementations, an external seam line 234 at an area of attachment between the base portion of the top component and bottom plate may be fused, e.g. melted with a hot tip of a soldering tool, so that the seam line 234 is not visible on the receptacle 200. Fusing of the base portion and bottom plate may create a single integrated receptacle unit with the protrusion portion, base portion and bottom plate.

The connection members that attach the bottom plate 204 and base portion 212 of the top component 202 include multiple pegs 206 extending from the bottom plate 204 and holes 208 extending through the base portion 212. In some implementations, the hole 208 may continue from an upper surface 222 of the base portion 212 and to the lower side of the base portion 212. The peg 206 may have a height greater than the base portion such that the peg 206 sticks out of the upper surface 222 of the base portion 212.

An assembled port 226 includes an upper port section 230 of the base portion 212 and a lower port section 232 of the bottom plate 204. The corresponding upper channel section and lower channel section joins to form one or more assembled channels 224 to receive the strand coupled to the active marker light component. The assembled channel 224 may be sized to snuggly fit the strand and discourage movement of the active marker light component couple to the strand. In some exemplary implementations, the assembled channel may be about 1 mm to 5 mm wide, for example, 2 mm wide, and about 2 mm to 6 mm deep, for example 3 mm deep. The assembled entrance channel may extend from an assembled entrance port 226 to a platform for the active marker light component. The assembled exit channel may extend from the platform for the active marker light component to an assembled exit port 226. An example channel length may be about 5.0 mm to 8.0 mm, such as about 6.2 mm in length. Other assembled channel dimensions are possible based on the diameter of the strand and materials to permit the strand to be positioned within the assembled channel and to restrict movement of the active marker light component.

A sealant material 240 (shown as a darkened dotted line in FIG. 2b) may cover at least a portion of the exterior surface of the receptacle. In some implementations, the sealant material 240 may coat exterior surface of the bottom portion and base plate. The protrusion portion may be uncoated and void of the sealant material. In other implementations, sealant material may coat the entire exterior surface of the receptacle. In some implementations in which the sealant material covers at least part of the protrusion portion, the sealant material may be a clear coating that permits transmissivity of the light from the active marker light component.

The sealant material may also be embedded inside of pores 220 of the base portion 212 and/or bottom plate 204 and the assembled port 226 with the strand (not shown) extending from the assembled port 226. The thickness of the sealant material may be sufficient to protect the active marker light component residing within the receptacle from environmental conditions, e.g. moisture. In some implementations, the sealant material may be more heavily coated on areas of the receptacle vulnerable to moisture, such as across seam lines and port areas.

In some implementations, a sealed access hatch (not shown) may be provided on the receptacle, such as the backside of the receptacle, to provide access to the active marker light component. The access hatch may include a sealing, e.g. rubber gaskets, compression latch(es), etc., mechanism to tightly engage the hatch and ensure environmental elements do not seep into the interior of the receptacle. The access hatch may be used to service, remove, replace and/or repair the active marker light component, battery, and/or other internal components without disrupting the sealant material on the active marker apparatus.

Figure 2C:
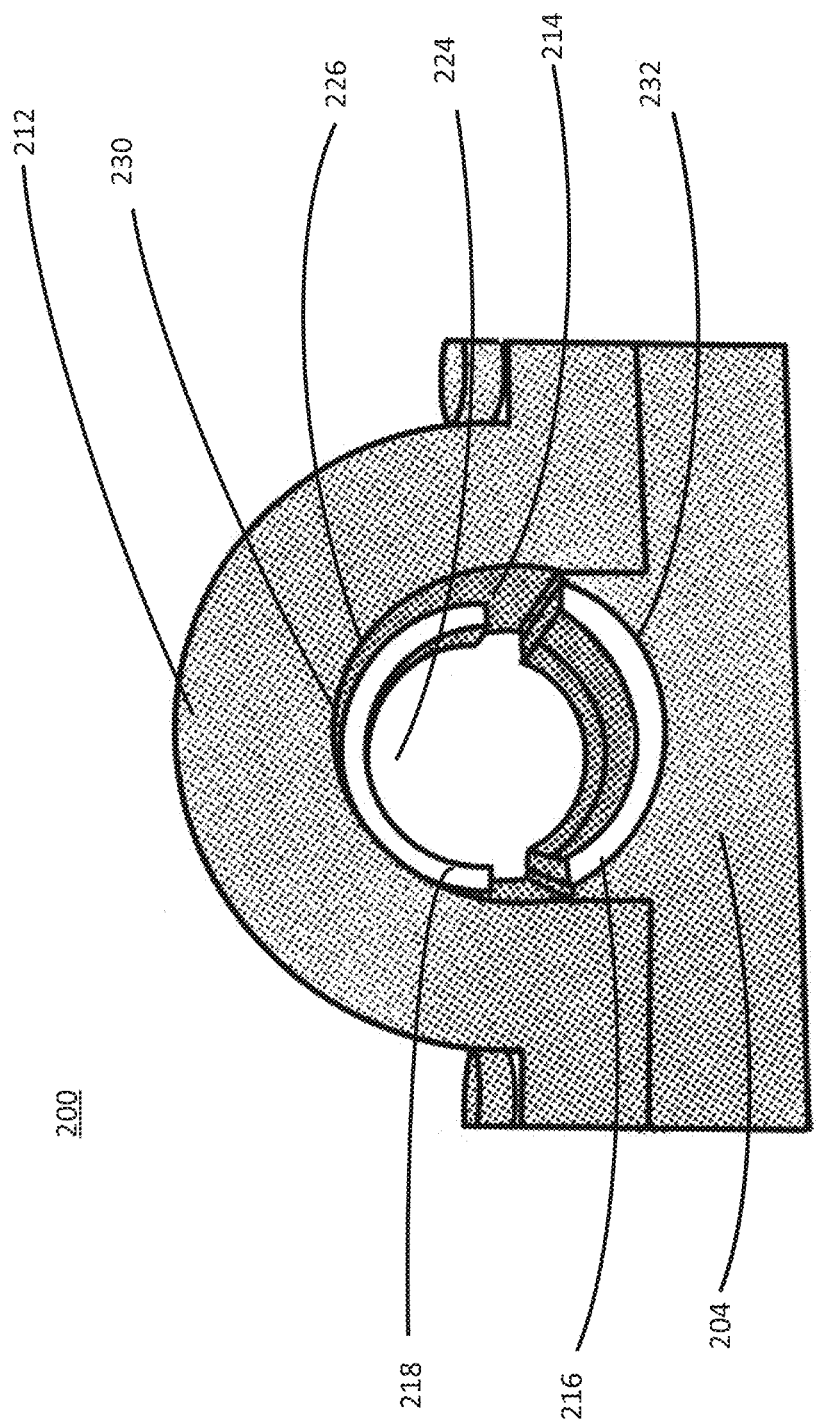
FIG. 2c is an enlarged view of an exemplary sealed active marker receptacle with a strand port, in accordance with some implementation.

FIG. 2c is an enlarged view of an assembled port 226 of FIG. 2b, at the exterior end of an assembled channel. The assembled channel is made up of the upper channel section 214 and lower channel section 216. The lower channel section includes bumps 218. The assembled port 226 is formed by the joining of the upper port section 230 of the base portion 212 and lower port section 232 of the bottom plate 204. For illustration purposes, the receptacle in FIG. 2C does not include an active marker light component and strand. When in use, the strand extends from the assembled port 226 and engages with the bumps 218 in the assembled channel 224.

FIG. 3a is a view of the top of an exemplary bottom plate 300 of a sealed active marker receptacle. The top side of the bottom plate 300 is enclosed in the receptacle when assembled. In this exemplary bottom plate 300, a pair of front pegs 306a flanks opposite sides of a lower channel section 316a near a lower port section 332a, such that one peg 306a is on one side of the lower channel section 316a and the other peg is located on the opposite side. When the receptacle is assembled, the lower port section 332a engages with the upper port section 330a (shown in FIG. 3b) to form an exit port. A pair of rear pegs 308a flanks the lower channel section 316a behind the front pegs 306a, such that one peg 308a is on one side of the lower channel section 316a and the other peg is located on the opposite side.

A second pair of front pegs 306b and pair of rear pegs 308b flank another lower channel section 316b near another lower port section 332b. Another pair of rear pegs 308b flanks another lower channel section 316b near another port section 332b. When the receptacle is assembled, the lower port section 332b engages with the upper port section 330b (shown in FIG. 3b) to form an entrance port.

The bottom plate 300 may further include a platform 322 for holding the active marker light component 130. The lower channel section 316a receives a segment of the strand 108 that extends from the entrance port (formed by the lower port section 332b) to the platform 322. The lower channel section 316b receives a segment of the strand 108 that extends from the platform 322 to the exit port (formed by the lower port section 332a). The channel may also be viewed as a single continuous channel with a central area (also referred to herein as the "platform") for the active marker light component 130.

Further to the bottom plate 300, the lower channel sections 316a, 316b include multiple bumps 318 spaced at intervals with voids 320 between the bumps 318. The bumps engage the strand 108 to resist slippage of the strand in the channels, secure the active marker light components onto platform 322. The bottom plate 300 also includes a plurality of pores 326 for receiving sealant material when the receptacle is assembled.

FIG. 3b is a view of the underside of a top component 350 including a base plate 352 of an exemplary sealed active marker receptacle. The underside of the top component is enclosed in the receptacle when assembled.

The base plate 352 includes a pair of front holes 356a that flanks opposite sides of a upper channel section 366a near an upper port section 330a, such that one hole 356a is on one side of the upper channel section 316a and the other hole 356a is located on the opposite side. When the receptacle is assembled, the upper port section 330a engages with the lower port section 332a (shown in FIG. 3a) to form an exit port. A pair of rear holes 358a flanks the upper channel section 366a behind the front holes 356a, such that one hole 358a is on one side of the upper channel section 366a and the other hole 358a is located on the opposite side.

A second pair of front holes 356b and pair of rear holes 358b flank another upper channel section 366b near another upper port section 332b. Another pair of rear holes 358b flanks another upper channel section 366b near another port section 332b. When the receptacle is assembled, the upper port section 330b engages with the lower port section 332b (shown in FIG. 3a) to form an entrance port.

The base portion 352 may further include an aperture 372 that opens into the internal cavity 374 of the top component 300. The aperture 372 permits light emitted from the active marker light component 130 to enter the internal cavity 374, from which the light diffuses into a live action scene for detection by a sensor.

The upper channel section 366a engages with a segment of the strand 108 that extends from the entrance port (formed by the upper port section 330b) to the aperture 372. The upper channel section 376b receives a segment of the strand 108 that extends from the aperture 372 to the exit port (formed by the upper port section 330a).

The upper channel sections 366a, 366b include a plurality of bumps 368 spaced at intervals with voids 370 between the bumps 368. In some implementations, bumps 368 of the base portion 352 are positioned in alternating locations in the upper channel portions 366a, 366b, relative to the bumps 318 in the lower channel portions 316a, 316b of the bottom plate 300. In this manner, the locations of bumps 368 of the base portion 352 correspond with the voids 320 of the lower channel portions 316a, 316b.

The base portion 352 also includes a plurality of pores 376 for receiving sealant material when the receptacle is assembled. The pores 376 may correspond with pores 326 of the bottom plate 300 to make a continuous pore through the receptacle when assembled. The sealant material may fill the continuous pore to enhance adhesion of the sealant material to the receptacle.

Figure 4:
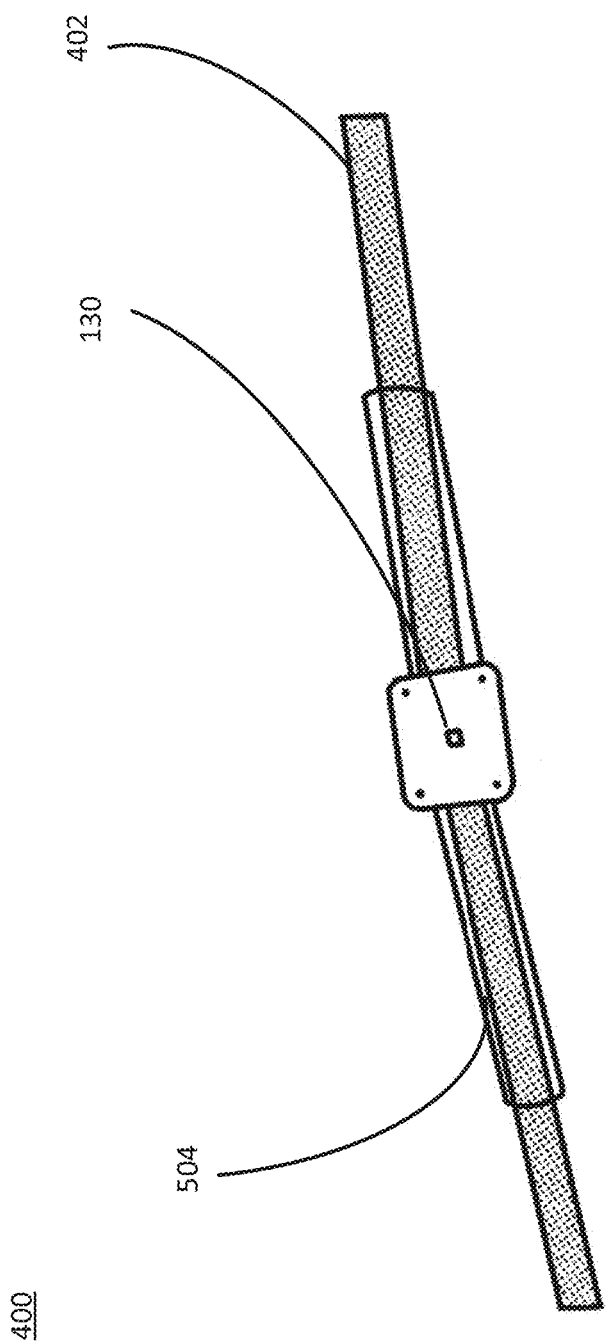
FIG. 4 is a top view of an exemplary active marker light component and strand, in accordance with some implementations.

FIG. 4 illustrates an active marker light component 130 prior to assembly within the receptacle. The active marker light component 130 is coupled to a strand 402. In some implementations, a protective covering 404, e.g. heat shrink tubing may cover internal wires at an area of the strand in which the active marker light component is attached to the strand and the general area of the receptacle once the active marker light component is inserted into the receptacle. The protective covering 404 may serve to add a further layer of insulation, to additionally protect and seal the active marker light component 130 with the strand 402.

The strand typically includes a flexible material. The strand may contain an encased wire or may be a naked wire. The wire typically includes a highly conductive element, such as copper, silver, gold, or aluminum, and may be uncoiled, stranded, solid, braided, etc. The strand may provide a pathway for electronic communication between various components of the active marker apparatus. For example, the strand may be a conduit of electrical signals between components and/or provide a supply of power, such as from/to one or more control units and active marker light components, between the active marker light components within a group, and/or between groups of active marker light components with other groups of active marker light components.

The active marker light component 130 may include one or more light sources, such as an LED or an array of a plurality of LED's (e.g. a bundle of three LED's). A plurality of active marker light components 130 may be coupled to the strand 402, such as 2 to 15, for example, 8 active marker light components on a strand.

Figure 5:
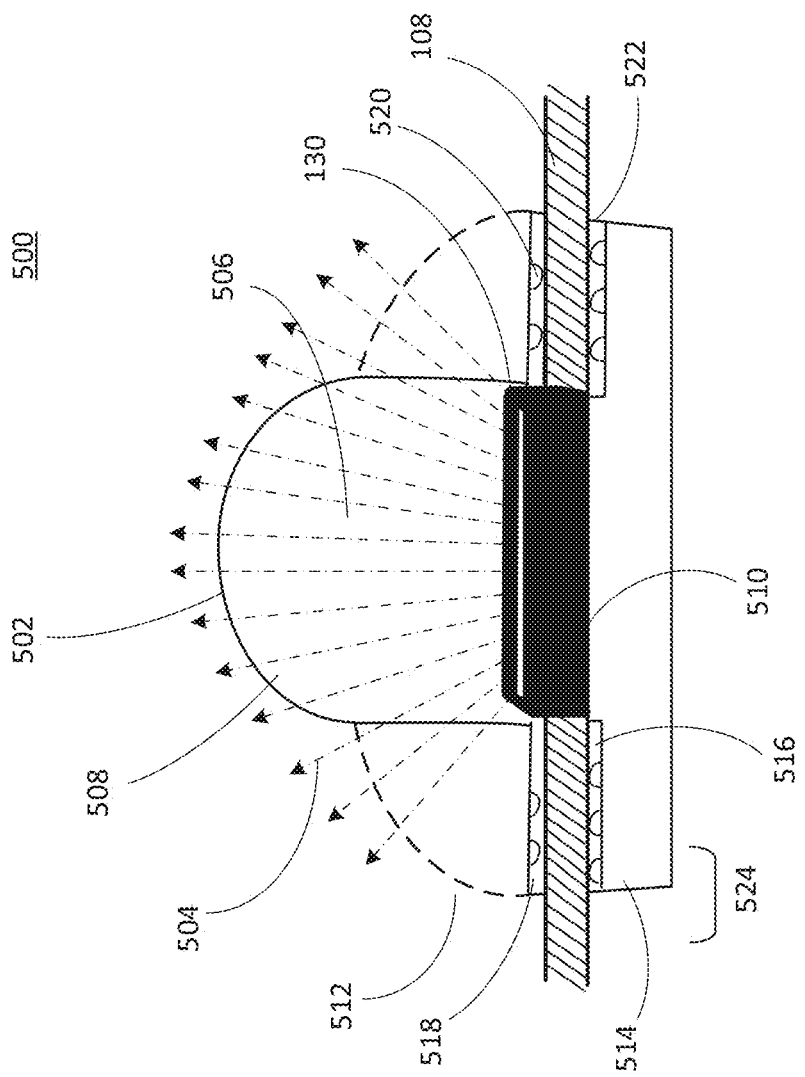
FIG. 5 illustrates an exemplary cutaway side view of a receptacle with an active marker light component that emits light, in accordance with some implementations.

FIG. 5 is cutaway side view of an exemplary sealed active marker apparatus 500 is provided in which a receptacle 502 houses an active marker light component 130 and strand 108. Active marker light component 130 sits in a platform 510 of a base portion 512 of the receptacle 500. When in use, the active marker light component 130 emits light 504 from the bottom of an internal cavity 506 and through walls of the protrusion portion 508 of the receptacle 502. The light 504 diffuses into a live action scene for detection by one or more sensor devices, e.g. cameras, configured to detect the particular wavelength range of the light 504.

A lower channel section 516 of the bottom plate 514 and an upper channel section 518 of the base portion 512 form assembled entrance and exit channels that hold the strand 108 and the strand 108 engages with bumps 520 of the lower channel section 516 and upper channel section 518.

Entrance and exit ports 522 are formed at the external ends of the assembled channels. Port areas 524 include the entrance and exit ports 522 and at least a segment of the strand proximal to the exit and entrance ports 522. The size of the strand segment in the port area is shown by way of example in FIG. 5, and may include larger or smaller strand segments extending from the ports 522.

The port area 524 may be coated with a sealant material to seal the interior of the receptacle area that holds the active marker light component. In some implementations, the sealant material coats an entire strand and all of the receptacles coupled to the strand. In still some implementations, the sealant material covers the entire strand, and the area of the receptacles that include the base portion, bottom plate, including the pores and port area. In such embodiments, the protrusion portion may remain uncoated by the sealant material. The protrusion portion may remain bare to permit light to diffuse without disruption by the sealant material. In other implementations, a clear sealant material may be used on the protrusion portion.

Figure 6:
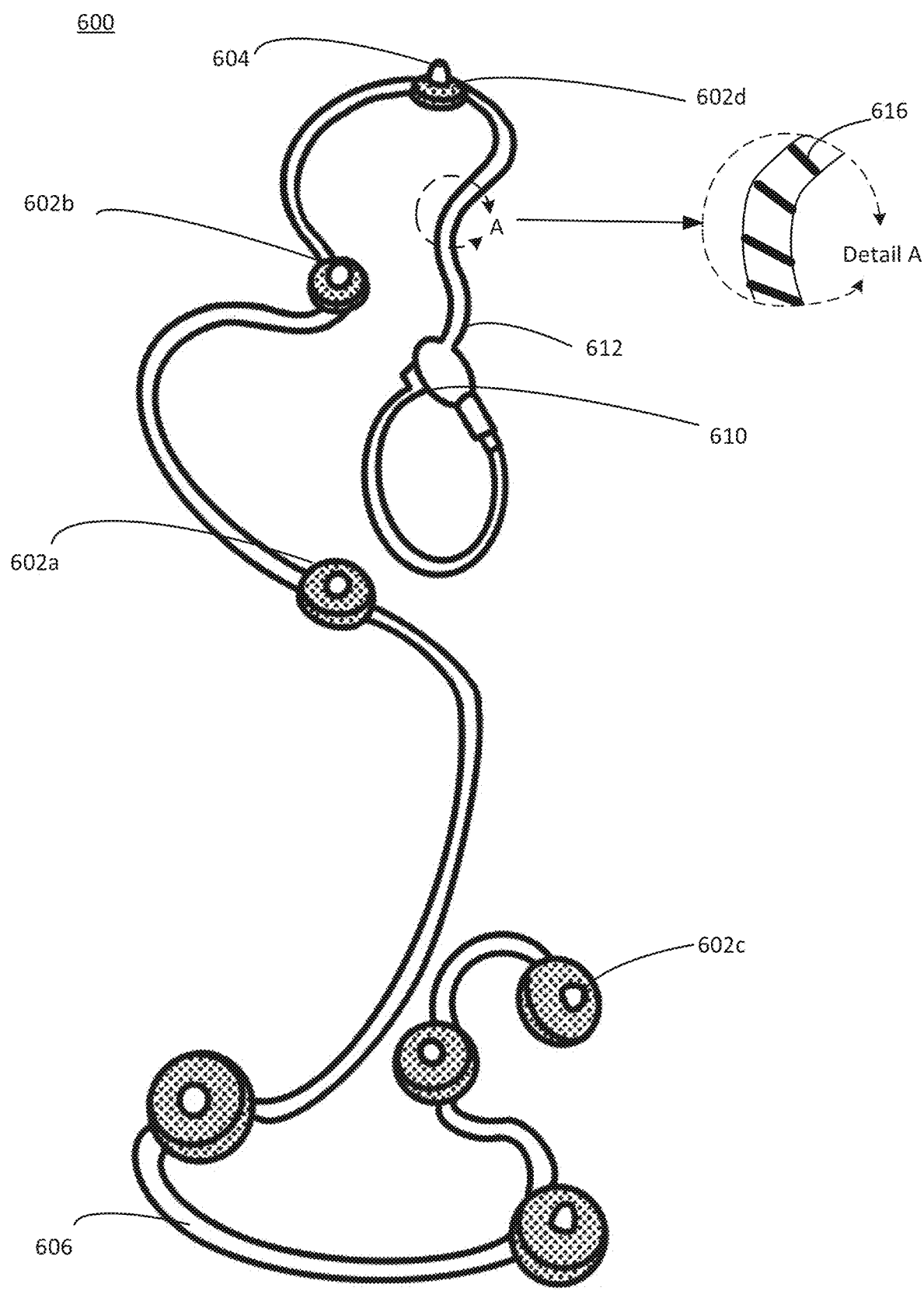
FIG. 6 is an exemplary sealed active marker apparatus with a sealed strand and receptacles, in accordance with some implementations.

FIG. 6 is an exemplary sealed active marker apparatus 600 coated with a sealant material including a strand and multiple receptacles 602a-d, each internally holding an active marker light component within the receptacles.

The protrusion portion 604 may be a contrasting color, such as yellow, that is distinct from the color of the other portions of the active marker apparatus and/or the color of the wearable article intended for the active marker apparatus. For example, the protrusion portion 604 may be yellow or orange and the remaining receptacle areas and strand may be a neutral color, e.g. grey. The color of the other receptacle areas and strand may blend with a color of the wearable article. In some implementations, a tinted sealant material may be applied to the receptacle, on the protrusion portion 604, and/or to other receptacle areas.

The strand 606 may enter and exit a receptacle at 180 degrees, and may be in alignment with the receptacle, as shown at receptacle 602a. At various receptacles, the strand 606 may have a curvature before entering a receptacle and/or after exiting the receptacle, as shown at receptacle 602b. The strand may be flexible to be formed, e.g. curved, with shapes of the areas of the wearable article on the object, to which the receptacles are attached. In some implementations, the strand 606 enters a receptacle and terminates at the receptacle, as shown at terminal receptacle 602c.

One or more ends of the strand 606 may include a coupler 610 to attach to a control unit (not shown). The coupler 610 may make an electrical connection between electrical components, e.g. wires, of the strand 606 and the control unit. In some implementations, initial segment of strand, e.g. a proximal end of the strand 612 at the coupler 610 and prior to entering an initial receptacle 602d may be uncoated by sealant material. For example, the initial segment of strand may be a bare wire. In some implementations, the active marker apparatus is fully encapsulated with the sealant material including the control unit. The fully encapsulated active marker apparatus may be fully submersible for underwater shoots. In some implementations, the active marker apparatus may be fully encapsulated except for the protrusion portions of the receptacles so as not to hinder disbursement of light.

In some implementations, as shown in a bottom view of the strand (underneath side facing the wearable article) in Detail A of FIG. 6, the strand 606 may include a plurality of spaced adhesive elements 616, e.g. adhesive strips, for adhesion of the sealed active marker apparatus 600 to an outer and/or inner surface of a wearable article. The adhesive elements 616 may be slanted bands set apart along the length of an underside and/or topside of the strand. Other configurations of adhesive elements 616 are possible. The adhesive elements 616 may also be positioned under the bottom plate of the receptacle for attachment on the outer surface of the wearable article. Placement and spacing of the adhesive elements are determined to minimize grabbing or pulling of the suit by the sealed active marker apparatus.

The adhesive elements 616 may include a variety of mechanical and/or chemical fasteners, e.g. hook and loop, snaps, straps, flaps, glue, etc. In some implementations, the strand may be directly sewn onto the wearable article. In still some implementations, the strand may be inserted into folds in the wearable article. The flaps may be secured to hold the strand rather than or in addition to the strand having adhesive elements 616. In some implementations, the sealed active marker apparatus may include various lengths of strands to fit different sizes of wearable articles, e.g. small, medium, and large.

Example Apparatus on a Wearable Article

Figure 7:
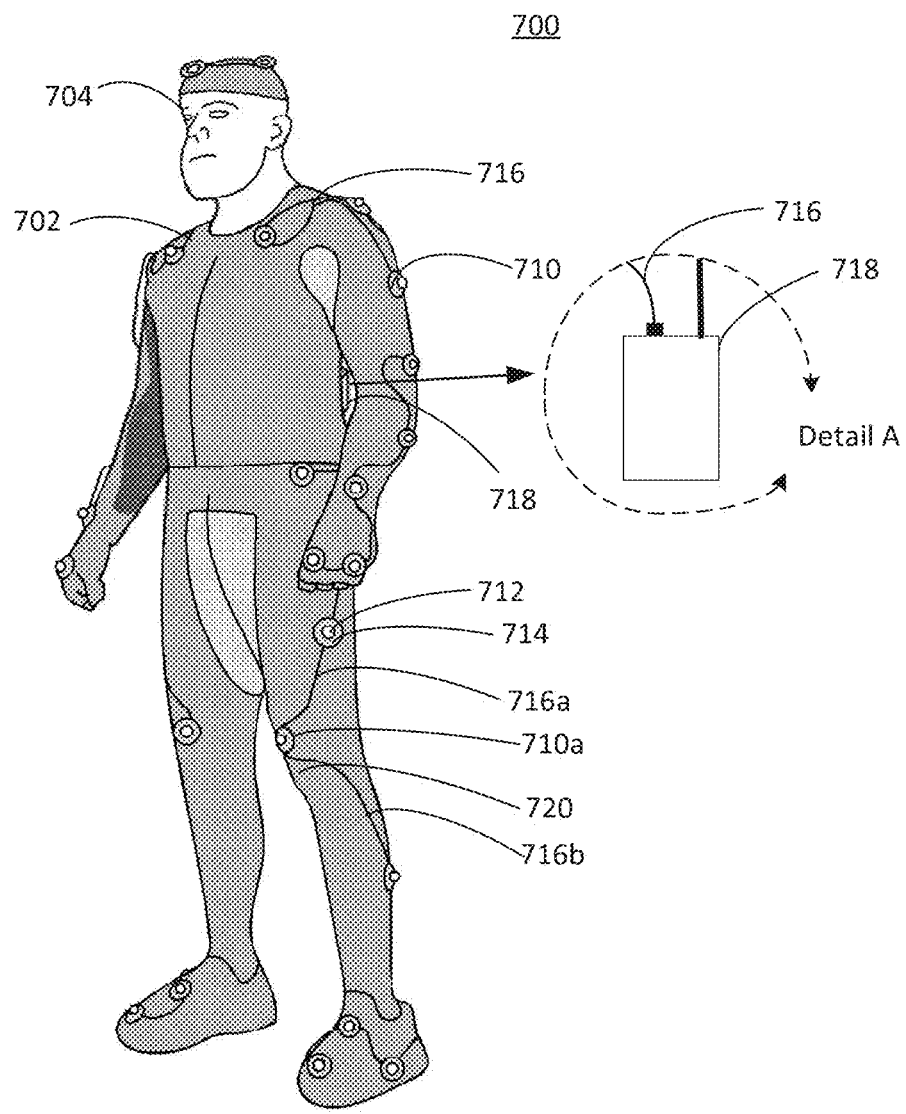
FIG. 7 is an illustration of exemplary sealed active marker apparatus attached to clothing of an actor, in accordance with some implementations.

As shown in FIG. 7, the sealed active marker apparatus 700 may be externally worn on a suit 702 of an actor 704. A suit as a wearable article is depicted in FIG. 7 as one example of a wearable article. The description of the sealed active marker apparatus with regard to a suit may be applied to different other types of wearable articles.

The sealed active marker apparatus 700 may include multiple active marker receptacles 710 attached to various strands 716. The receptacles 710 include a protrusion portion 712 and bottom portion 714 that may have a distinct color from the remaining receptacle, strand and suit.

The active marker receptacles 710 may be coupled in groups onto individual strands 716. In some implementations, one or more individual strands may be devoted to an appendage of the suit 702, e.g. arm area and leg area. In some implementations, various strands may include different types of active marker light components. Strands on the top of the suit from the torso area upward may include active marker light components emitting a particular wavelength of light, which may be different from the active marker light component light emitted from strands on the bottom below the torso. For example, in some production shoots in which an actor may walk in water, the bottom strands may be sealed active marker light components emitting a blue wavelength light, whereas the active marker light components in top strands emit infrared light and may be unsealed. Different cameras may be devoted to particular wavelengths of light from different active marker light components.

In some implementations, the strand and active marker receptacles may be attached to the wearable article in manner that minimizes pulling of the strand during actor movement and reduces restriction of movement by the actor, which may be otherwise caused by the active marker apparatus. At times, an active marker receptacle may be positioned at or near a joint area of the wearable article that correspond with a joint (e.g. knee, elbow, wrist, ankle, etc.) of an actor (e.g. person or animal) or other mechanically moving object (e.g. robot). In this circumstance, the strands may be positioned via a side approach to near the joint area, e.g. wrap above or below the joint area, or around the joint area, rather than extend in a vertical direction parallel to and through the joint. For example, the strand may extend to the active marker receptacle near the joint area from a side area of the wearable article and the strand may continue away from the active marker receptacle back to the same/similar side area. Weaving and looping of the sealed active marker apparatus to different positions on a wearable article may also enable a given length of a strand to be used for a variety of different sizes of wearable articles.

In the example shown in FIG. 7, the joint of the wearable article corresponds with a knee joint. The strand 714a is positioned along an outer side area of a leg area, extended to an active marker receptacle 710a above the knee joint area 720 and the strand 714b loops back above the knee joint area 720 to the outer side area of the leg area.

In some implementations, the strand may enter and exit at opposite ends of the receptacle and have a curvature before and/or after the receptacle. In some implementations, the strand may be flexible to manually create the curvature in the strand. In some implementations, the receptacle may include slanted channels to create an angled pathway for the strand entering and exiting the receptacle.

In FIG. 7, the control unit 718 is shown in a position on the back of the suit 702. As shown in Detail A of FIG. 7, the strands 716 may be electrically coupled to and extend from a control unit 718, by attachment of wire(s) in the strand 716. In some implementations, the various strands may combine into a cable segment of the wire at or near the area of attachment to the control unit 718.

In various implementations, the control unit 718 may be positioned at a variety of locations on the object or suit 702. In some implementations, the control unit 718 may be moveable to various positions in the suit 702. The control unit 718 may reside in a pouch in the suit and multiple pouches in different locations may be available on the suit to receive the control unit. If the actor 704 is required to move for a shoot in a manner that may damage the control unit, the control unit may be relocated to another pouch in a different part, e.g. from the upper back to the torso side or leg, of the suit 702. The control unit may be secured in the pouch with by a closure such as a zipper, strap, buttons, hook and loop, etc. The pouch may be configured e.g., lined with supportive material, to support the control unit so that the weight of the control unit does not affect the fit of the wearable article, such as by making the suit sag. Other fasteners and supports are possible to secure the control unit to the suit.

The control unit 718 may include a battery unit for the active marker light components. The battery unit may be replaced as needed when the energy runs low by detaching from the strands and wearable article, without the object, e.g., actor, needing to remove the wearable article. For example, the battery may last about 2 to 6 hours, such as about 5 hours. Various types of batteries may be employed with different capacities. In some implementations, the control unit has dedicated power supplies for each strand or for groups of strands. In some implementations, the active marker light components may each have its own dedicated power source, which may supplement or replace a control unit power unit.

In some implementations, the control unit may include a receiver and/or transmitter for receiving and/or sending signals to a signal controller (such as item 122 in FIG. 1). For example, the control unit 718 may receive syncing signals that dictate the pulsing of the active marker light components. In some implementations, different signals may be received for particular strands, indicating individual strands or groups of strands to pulse at a different rate. In some implementations, the pulsing control may be according to a pre-determined phase lock that is synchronized with the detection cameras.

In some implementations, the control unit 718 may transmit status signals back to a receiver, e.g., signal controller. For example, status signals may indicate battery levels, active marker failures, or other warnings. In some implementations the control unit 718 may include recording mechanisms to record active marker data, such as facial data. Such data may be transmitted to a receiver.

In some implementations, the strand may be coupled to the wearable article by a variety of adhesive elements, such as hook and loop, snaps, straps, flaps, adhesive strips, or the strand may be directly sewn onto the wearable article. In still other implementations at least some of the strand may be fastened to the interior surface underneath the wearable article rather than the exterior surface of the wearable article. At times, some of the receptacles may be attached directly to an object (e.g. skin), such as through use of adhesives.

Example Method of Making

FIG. 8 is a flowchart of an exemplary method of making a sealed active marker strand. One or more active marker light components are grouped onto one or more strands. The active marker light component may be placed onto the strand and electrically coupled to the interior wire of the strand.

In block 802, each receptacle (such as 200 in FIG. 2a) for an active marker light component on a strand, is injection molded. The components of the receptacle include the protrusion portion (such as 202 in FIG. 2a), base portion (such as 212 in FIG. 2a, 352 in FIG. 3b) and bottom plate (such as 204 in FIG. 2a, 300 in FIG. 3a). These components may be composed of plastic or other convenient material. For example, the material may be melted, injected into predesigned molds for individual components, and cooled.

The injection molds for the receptacle include features to produce elements of the receptacle components. For example, the injection mold for a bottom plate may include channels, channel bands, pegs, pores, and other elements, as described above with regard to FIGS. 2a, 2b, and 2c, and FIG. 3a. The injection mold for a base portion may include channels, channel bands, holes, pores, and other elements, as described above with regard to FIGS. 2a, 2b, and 2c, and FIG. 3b. The injection mold for a protrusion portion may include a dome shape, or other suitable shape, internal cavity, and other elements, as described above with regard to FIGS. 2a and 2b. The protrusion portion and base portion components may be fused together, as described below. In some implementations the protrusion portion and base portion may be a single molded component. In some implementations, plastic material used to produce the molded protrusion portion may be tinted with a contrasting color.

In block 804 an active marker light component that is coupled with a strand, is positioned onto a platform on the bottom plate. In block 806 the strand is engaged into the lower channel sections of the bottom plate. A proximal segment of the strand is inserted into a lower channel section that leads to the platform and a distal segment of the strand may be inserted in a lower channel section leading from the platform.

In block 808 pegs of bottom plate are inserted into corresponding holes of base portion. The active marker light component and strand segments that are proximal the active marker light component, are positioned into the bottom plate, prior to attaching the bottom plate with the base portion. The strand may be installed into the receptacle by engaging the strand into the respective channels of the receptacle, such as gripping the strand between alternating spaced bumps in the channels. By securing the strand into the channels, the active marker light component is firmly positioned in the platform thereby forming a gap within a chamber between the active marker light component and protrusion portion. In this manner, the active marker light component may be stabilized within the receptacle, thereby ensuring a consistent amount of light and position of the light projecting from the protrusion portion.

In block 810, receptacle components including the base portion and bottom plate may be fused together. Fusing may employ any technique to seal the crease between the components. For example, the base portion and bottom plate may be fused by clamping the two parts together. A hot metal tip from a soldering iron may be used to melt the pegs of the bottom plate protruding through the holes of the base portion.

In decision block 812, it is determined whether there are more active marker light components on the strand being handled. If there are more active marker light components on the strand to insert into receptacles, the process returns to block 804 to position the next active marker light component into a next receptacle. In some implementations, multiple receptacles may be injection molded in batches and a next receptacle is retrieved for the next active marker light component on the strand. If there are no more active marker light components on the strand, the process continues to seal the receptacle(s).

In block 814 a sealant material is applied to coat at least a portion of the receptacle(d) and strand. The sealant material provides an encasement for each receptacle. The sealant may be embedded into pores in the base portion and bottom plate. The pores provide surface area to which the sealant material may adhere. In some implementations, surfaces of the receptacle may be etched, contoured or otherwise modified to increase gripping of the sealant material.

The sealant material may be applied to the entire sealed active marker apparatus, except the sealant material may be excluded from the protrusion portion of the receptacle, the control unit, and the connection segments of strand immediately coupled to the control unit. In some implementations, the sealant material may be applied to particular portions of the receptacle and strand, such as port areas of the receptacle, strand segments proximal to the receptacle, e.g. strand segments entering and/or exiting the receptacle; strand segments connecting receptacles, and the receptacle components. The sealant material may be tinted, e.g. dyed, for example to match with the color of the wearable article. In some implementations, the protrusion portion of the receptacle may be coated with a clear sealant material or one that is tinted with a contrasting (e.g. distinct) color. In some implementations, the receptacle may include an access hatch that may remain free of the sealant material.

The sealant material may a liquid applied by pouring the sealant material into a mold of the parts to be coated. The mold may be shaped and sized to hold the strand and the receptacle(s). The mold may include a cutout area for the protrusion portion that is excluded from the coating. In one method of coating the sealed active marker apparatus, the mold may be initially skimmed with a thin layer of the sealant material, which may be applied to the mold by a tool or finger. The initial layer may be allowed to dry. The sealed active marker apparatus may be positioned into the mold and additional sealant material may be poured into the mold to cover the sealed active marker apparatus. The sealant material is cured to harden. If sealant material contacts particular components that are intended to be free of the sealant material, such as the protrusion portion of the receptacle, the excess sealant material may be trimmed off. Other methods of applying the sealant material are possible, such as pouring, spraying, brushing, dipping, or rolling the sealant material directly onto the sealed active marker apparatus. Once cured, the sealant material creates a protective barrier, e.g. waterproof, water resistant, to protect the active marker light component and strand against water, moisture, air, and other potential hazards for the active marker light component and strand.

In block 816 adhesive elements may be applied to the strand and/or receptacle to assist in attaching the sealed active marker apparatus to the wearable article. The adhesive elements may be applied with various types of glue.

In block 818 the sealed active marker apparatus is attached to wearable article. The strand may be also attached to the control unit. In some implementations, the sealed active marker apparatus may be pre-rigged onto the suit prior to an actor putting on the suit.

The sealed active marker apparatus, including the active marker light components and strands may be configured to be removable from the wearable article. For example, after a production shoot, the adhesive elements of the strands may be dislodged from the wearable article. The control unit may be also removed from its location on the wearable article, e.g. a pouch or straps, and the active marker light components/strands may be disconnected from the control unit. In this manner, the wearable article could available for treatment, such as cleaned or repaired. The sealed active marker apparatus may be available for reattachment to the same wearable article or a different wearable article. The portions of the sealed active marker apparatus encased with the sealant material may not be available for replacement or repair. For example, malfunction of an encased active marker light component and strand may require replacement of these components.

In some implementations, portions of the strand and active marker light component may include removable parts that enable replacement of defective portions. For example, a receptacle may include a protrusion portion that may be released from the receptacle to access an active marker light component for replacement of the active marker light component. In some implementations, the strand may include coupling areas may be decoupled to replace portions of the strand.

Although the steps may be presented in a specific order, this order may be changed in different particular implementations. In some particular implementations, multiple steps shown as sequential in this specification can be performed at the same time, such as in batch processing.

Example Computer System

Figure 9:
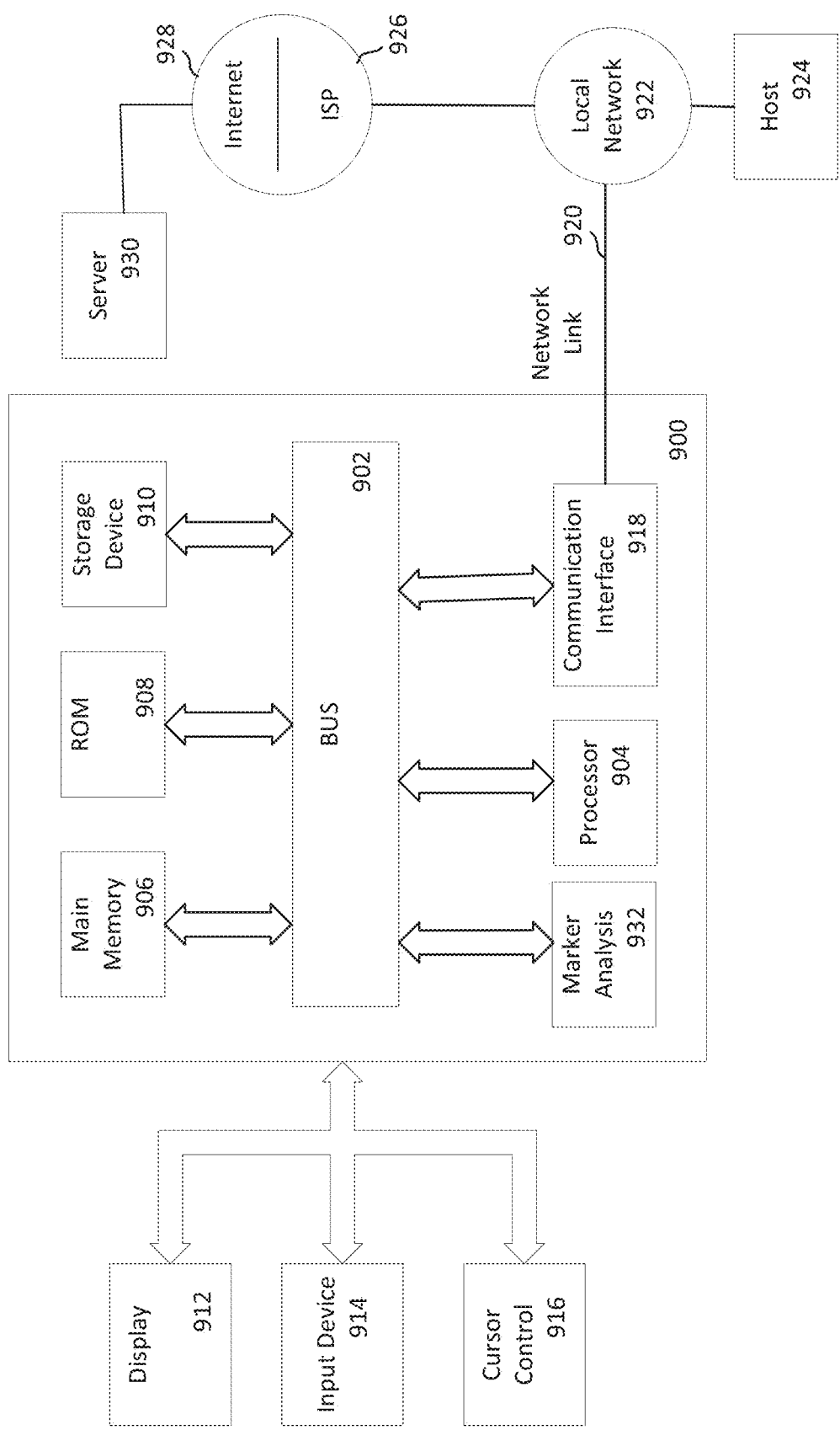
FIG. 9 is a block diagram illustrating an example computer system upon which computer systems of the systems illustrated in FIG. 1 may be implemented.

As shown in FIG. 9, a computer system 900 may be employed upon which the performance capture system (such as 120 in FIG. 1) and/or the CG rendering system (such as 126 in FIG. 1) may be implemented. The computer system 900 includes a bus 902 or other communication mechanism for communicating information, and a processor 904 coupled with the bus 902 for processing information. The processor 904 may be, for example, a general purpose microprocessor. The computer system 900 may include a marker analysis component 932 to determine the marker arrangement from marker data (for example, items 122 and 124 respectively, of FIG. 1) representing positions of the detected markers.

The computer system 900 also includes a main memory 906, such as a random access memory (RAM) or other dynamic storage device, coupled to the bus 902 for storing information and instructions to be executed by the processor 904. The main memory 906 may also be used for storing temporary variables or other intermediate information during execution of instructions to be executed by the processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 002 for storing information and instructions.

The computer system 900 may be coupled via the bus 902 to a display 912, such as a computer monitor, for displaying information to a computer user. An input device 914, including alphanumeric and other keys, is coupled to the bus 902 for communicating information and command selections to the processor 904. Another type of user input device is a cursor control 916, such as a mouse, a trackball, or cursor direction keys for communicating direction information and command selections to the processor 904 and for controlling cursor movement on the display 912. This input device typically has two degrees of freedom in two axes, a first axis (e.g., x) and a second axis (e.g., y), that allows the device to specify positions in a plane.

The computer system 900 may implement the techniques described herein using customized hard-wired logic, one or more ASICs or FPGAs, firmware and/or program logic which in combination with the computer system causes or programs the computer system 900 to be a special-purpose machine. According to one embodiment, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 910. Volatile media includes dynamic memory, such as the main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 902. Transmission media can also take the form of acoustic or light waves, such as those generated during radio-wave and infrared data communications.

Various forms of media may be involved in carrying one or more sequences of one or more instructions to the processor 904 for execution. For example, the instructions may initially be carried on a magnetic disk or solid state drive of a remote computer. The remote computer can load the instructions into its dynamic memory and send the instructions over a network connection. A modem or network interface local to the computer system 900 can receive the data. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. Wireless links may also be implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP) 926. The ISP 926 in turn provides data communication services through the world wide packet data communication network now commonly referred to as the "Internet" 928. The local network 922 and Internet 928 both use electrical, electromagnetic, or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), the network link 920, and communication interface 918. In the Internet example, a server 930 might transmit a requested code for an application program through the Internet 928, ISP 926, local network 922, and communication interface 918. The received code may be executed by the processor 904 as it is received, and/or stored in the storage device 910, or other non-volatile storage for later execution.

For example, FIG. 9 illustrates the example visual content generation system 900 as might be used to generate imagery in the form of still images and/or video sequences of images. The visual content generation system 900 might generate imagery of live action scenes, computer generated scenes, or a combination thereof. In a practical system, users are provided with tools that allow them to specify, at high levels and low levels where necessary, what is to go into that imagery. and might use the visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

Example Live Action Capture System

Figure 10:
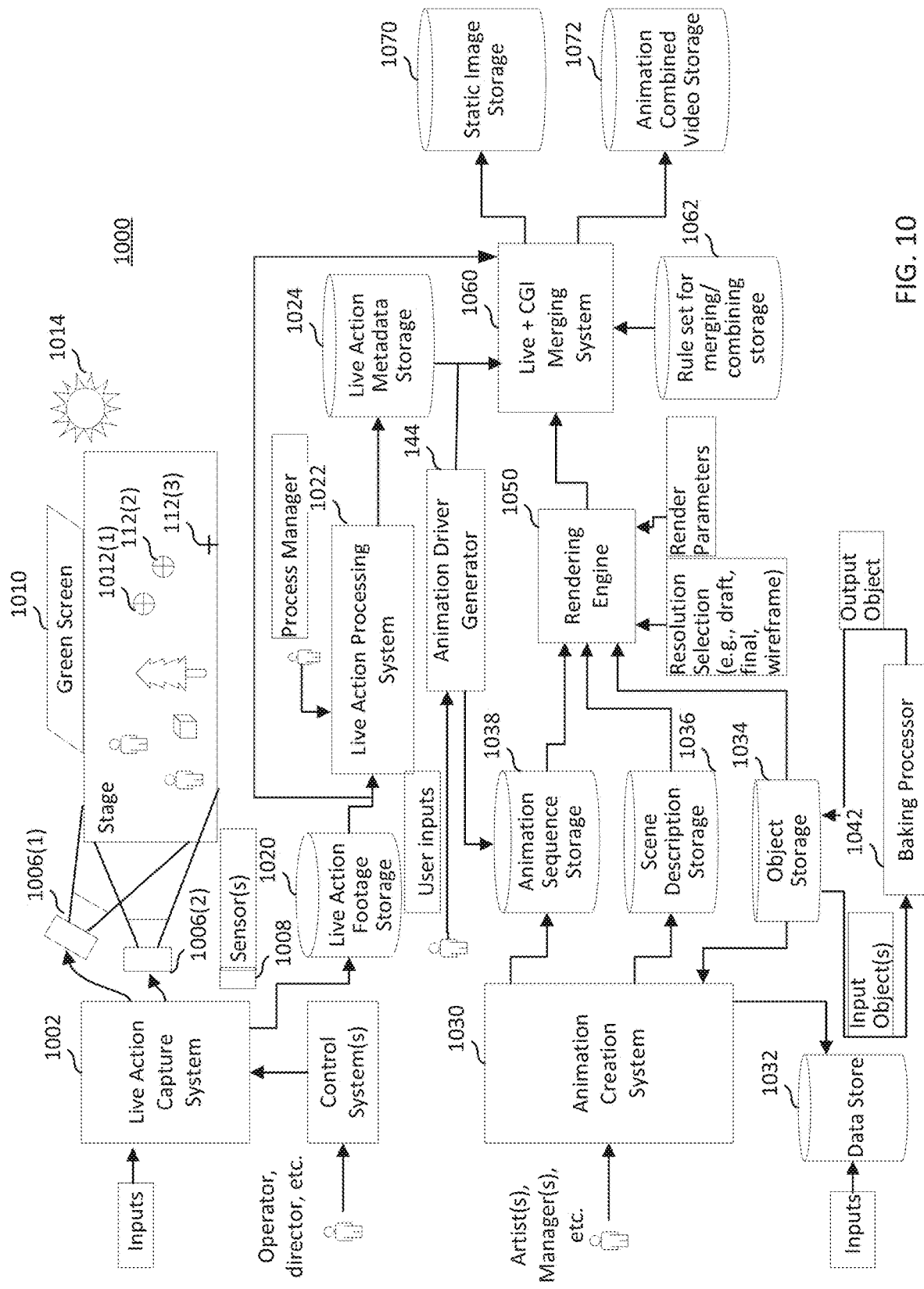
FIG. 10 illustrates an example visual content generation system as might be used to generate imagery in the form of still images and/or video sequences of images, in accordance with some implementations.

As illustrated in FIG. 10, a live action capture system 1002 captures a live scene that plays out on a stage 1004. The live action capture system 1002 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1006(1) and 1006(2) capture the scene, while in some systems, there might be other sensor(s) 1008 that capture information from the live scene (e.g., infrared cameras, infrared sensors, motion capture ("mo-cap") detectors, etc.). On the stage 1004, there might be human actors, animal actors, inanimate objects, background objects, and possibly an object such as a green screen 1010 that is designed to be captured in a live scene recording in such a way that it is easily overlaid with computer-generated imagery. The stage 1004 might also contain objects that serve as fiducials, such as fiducials 1012(1)-(3), that might be used post-capture to determine where an object was during capture. A live action scene might be illuminated by one or more lights, such as an overhead light 1014.

During or following the capture of a live action scene, the live action capture system 1002 might output live action footage to a live action footage storage 1020. A live action processing system 1022 might process live action footage to generate data about that live action footage and store that data into a live action metadata storage 1024. The live action processing system 1022 might include computer processing capabilities, image processing capabilities, one or more processors, program code storage for storing program instructions executable by the one or more processors, as well as user input devices and user output devices, not all of which are shown. The live action processing system 1022 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 1014, as that might be useful in post-processing to match computer-generated lighting on objects that are computer-generated and overlaid on the live action footage. The live action processing system 1022 might operate autonomously, perhaps based on predetermined program instructions, to generate and output the live action metadata upon receiving and inputting the live action footage. The live action footage can be camera-captured data as well as data from other sensors.

An animation creation system 1030 is another part of the visual content generation system 1000. The animation creation system 1030 might include computer processing capabilities, image processing capabilities, one or more processors, program code storage for storing program instructions executable by the one or more processors, as well as user input devices and user output devices, not all of which are shown. The animation creation system 1030 might be used by animation artists, managers, and others to specify details, perhaps programmatically and/or interactively, of imagery to be generated. From user input and data from a database or other data source, indicated as a data store 1032, the animation creation system 1030 might generate and output data representing objects (e.g., a horse, a human, a ball, a teapot, a cloud, a light source, a texture, etc.) to an object storage 1034, generate and output data representing a scene into a scene description storage 1036, and/or generate and output data representing animation sequences to an animation sequence storage 1038.

Scene data might indicate locations of objects and other visual elements, values of their parameters, lighting, camera location, camera view plane, and other details that a rendering engine 1050 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1030 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1034 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 1032 might be used to drive object presentation. For example, if an artist is creating an animation of a spaceship passing over the surface of the Earth, instead of manually drawing or specifying a coastline, the artist might specify that the animation creation system 1030 is to read data from the data store 1032 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1044 might read in live action metadata, such as data representing movements and positions of body parts of a live actor during a live action scene, and generate corresponding animation parameters to be stored in the animation sequence storage 1038 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1022. The animation driver generator 1044 might convert that movement data into specifications of how joints of an articulated CGI character are to move over time.

A rendering engine 1050 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 1050 might include computer processing capabilities, image processing capabilities, one or more processors, program code storage for storing program instructions executable by the one or more processors, as well as user input devices and user output devices, not all of which are shown.

The visual content generation system 1000 can also include a merging system 1060 that merges live footage with animated content. The live footage might be obtained and input by reading from the live action footage storage 1020 to obtain live action footage, by reading from the live action metadata storage 1024 to obtain details such as presumed segmentation in captured images segmenting objects in a live action scene from their background (perhaps aided by the fact that the green screen 1010 was part of the live action scene), and by obtaining CGI imagery from the rendering engine 1050.

A merging system 1060 might also read data from a rulesets for merging/combining storage 1062. A very simple example of a rule in a ruleset might be "obtain a full image including a two-dimensional pixel array from live footage, obtain a full image including a two-dimensional pixel array from the rendering engine 1050, and output an image where each pixel is a corresponding pixel from the rendering engine 1050 when the corresponding pixel in the live footage is a specific color of green, otherwise output a pixel value from the corresponding pixel in the live footage."

The merging system 1060 might include computer processing capabilities, image processing capabilities, one or more processors, program code storage for storing program instructions executable by the one or more processors, as well as user input devices and user output devices, not all of which are shown. The merging system 1060 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1060, such as modifying boundaries of segmented objects, inserting blurs to smooth out imperfections, or adding other effects. Based on its inputs, the merging system 1060 can output an image to be stored in a static image storage 1070 and/or a sequence of images in the form of video to be stored in an animated/combined video storage 1072.

Thus, as described, the visual content generation system 1000 can be used to generate video that combines live action with computer-generated animation using various components and tools, some of which are described in more detail herein. While the visual content generation system 1000 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Although the description has been described with respect to particular embodiments thereof, these particular embodiments are merely illustrative, and not restrictive. For example, in some implementations, a plurality of picture cameras may be used to capture images from various angles of the same live action scene or to capture different portions of the live action scene and the images may be stitched together or particular images selected for the output image. In various implementations, additional equipment, techniques and technologies may be employed to accommodate requirements of a particular visual production and live action scene, such as underwater scenes.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above. A computer readable medium can comprise any medium for carrying instructions for execution by a computer, and includes a tangible computer readable storage medium and a transmission medium, such as a signal transmitted over a network such as a computer network, an optical signal, an acoustic signal, or an electromagnetic signal.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A sealed active marker apparatus of a performance capture system, the apparatus comprising:
    an active marker light component coupled to a strand; and
    a receptacle comprising:
    a protrusion portion having at least one section that is transmissive to at least one particular wavelength range of light emitted from the active marker light component;
    a base portion coupled to the protrusion portion and including one or more upper channel sections;
    a bottom plate interlocking with the base portion to retain the active marker light component, the bottom plate including one or more lower channel sections corresponding with the one or more upper channel sections forming one or more assembled channels to receive the strand; and
    a sealant material coating at least a portion of the receptacle to promote a protective environment within the receptacle.

2. The apparatus of claim 1, wherein the bottom plate further comprises a plurality of pegs, and wherein the base portion includes a plurality of holes to receive corresponding pegs of the plurality of pegs.

3. The apparatus of claim 1, wherein the sealant material coats one or more port areas at an external end of the one or more assembled channels, and further coats at least a segment of the strand extending from the one or more assembled channels.

4. The apparatus of claim 1, wherein the base portion and the bottom plate include corresponding pores and the sealant material is embedded into at least a portion of the corresponding pores.

5. The apparatus of claim 1, wherein at least one of the one or more upper channel sections or the one or more lower channel sections includes channel bumps for engaging the strand.

6. The apparatus of claim 1, wherein the base portion and the bottom plate are fused together along a seam line.

7. The apparatus of claim 1, wherein an exterior surface of the strand comprises a plurality of spaced adhesive elements for adhering to an outer surface of a wearable article.

8. The apparatus of claim 1, wherein the strand includes an interior wire extending from the active marker light component to a control unit.

9. The apparatus of claim 1, wherein the protrusion portion includes a first color that is distinct from a second color of an outer surface of a wearable article to which the sealed active marker apparatus is attached.

10. The apparatus of claim 1, further comprising a control unit in electrical communication with the active marker light component and coupled to a proximal end of the strand.

11. A method of making an active marker apparatus for a performance capture system, the method comprising:
    injection molding components of a receptacle, wherein the injection molded components comprise:
    a top component including a protrusion portion having at least one section that is transmissive to at least one particular wavelength range of light emitted from an active marker light component and a base portion including one or more upper channel sections; and
    a bottom plate having a platform and one or more lower channel sections corresponding with the one or more upper channel sections;
    positioning the active marker light component onto the platform, wherein the active marker light component is coupled to a strand;
    installing the strand into the one or more lower channel sections;
    interlocking the base portion and the bottom plate together to form one or more assembled channels containing the strand and securing the active marker light component; and
    coating with a sealant material, at least a portion of the receptacle to promote a protective environment within the receptacle.

12. The method of claim 11, wherein the base portion includes a plurality of holes and the bottom plate includes a plurality of pegs corresponding to the plurality of holes, and wherein interlocking the base portion and the bottom plate includes inserting each of the plurality of pegs into a corresponding hole of the plurality of holes.

13. The method of claim 11, wherein coating with the sealant material includes embedding the sealant material into at least a portion of one or more port areas at an external end of the one or more assembled channels, and further coating at least a portion of the strand with the sealant material.

14. The method of claim 13, further comprising:
    applying a plurality of spaced adhesive elements on the coated at least portion of the strand for adhering to an outer surface of a wearable article.

15. The method of claim 11, wherein interlocking the base portion and bottom plate is by fusing a seam line at an area of attachment between the base portion and bottom plate, and wherein installing the strand into the at least one of the one or more lower channel sections includes engaging the strand with one or more bumps in at least one of the one or more lower channel sections or the one or more upper channel sections to inhibit movement of the strand.

16. The method of claim 11, further comprising:
    electronically coupling a proximal end of the strand to a control unit.

17. A performance capture system, comprising
    a plurality of active marker light components coupled to a strand;
    a plurality of receptacles, each receptacle corresponding with a respective active marker light component, wherein each receptacle comprises:

a protrusion portion having at least one section that is transmissive to at least one particular wavelength range of light emitted from the respective active marker light component, a base portion coupled to the protrusion portion and including one or more upper channel sections;

a bottom plate interlocked with the base portion, the bottom plate including a platform for receiving the respective active marker light component and one or more lower channel sections corresponding with the one or more upper channel sections forming one or more assembled channels to receive the strand, and a sealant material coating at least a portion of the receptacle to promote a protective environment within the receptacle; and at least one sensor device to detect light emitted from the plurality of active marker light components.

18. The performance capture system of claim 17, further comprising a control unit in electrical communication with the strand.

19. The performance capture system of claim 18, further comprising a signal controller for transmitting signals to the control unit to indicate a pulse rate for emitting of the light by the respective active marker light component.

20. The performance capture system of claim 17, wherein the protrusion portion includes a distinct color and the system further comprises a camera device to detect the distinct color.

* * * * *